United States Patent
Park et al.

(10) Patent No.: US 10,203,581 B2
(45) Date of Patent: Feb. 12, 2019

(54) ELECTROCHROMIC PHOTONIC-CRYSTAL REFLECTIVE DISPLAY DEVICE AND METHOD OF MANUFACTURING THE SAME

(71) Applicant: Industry-Academic Cooperation Foundation, Yonsei University, Seoul (KR)

(72) Inventors: Cheolmin Park, Seoul (KR); Taejoon Park, Seoul (KR); Taehyun Park, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 6 days.

(21) Appl. No.: 15/289,947

(22) Filed: Oct. 10, 2016

(65) Prior Publication Data
US 2017/0336692 A1   Nov. 23, 2017

(30) Foreign Application Priority Data
May 17, 2016   (KR) ........................ 10-2016-0059907

(51) Int. Cl.
*G02F 1/15* (2006.01)
*G02F 1/155* (2006.01)
*G02F 1/163* (2006.01)

(52) U.S. Cl.
CPC .............. *G02F 1/1508* (2013.01); *G02F 1/15* (2013.01); *G02F 1/155* (2013.01); *G02F 1/163* (2013.01);
(Continued)

(58) Field of Classification Search
CPC . G02F 1/15; G02F 1/155; G02F 1/163; G02F 1/1502; G02F 1/1523;
(Continued)

(56) References Cited

FOREIGN PATENT DOCUMENTS

| JP | 2004-260170 | 9/2004 |
|----|-------------|--------|
| KR | 10-2009-0033909 | 4/2009 |
| KR | 10-2016-0013291 | 2/2016 |

OTHER PUBLICATIONS

Tae Joon Park et al., "Electrically Tunable Soft-Solid Block Copolymer Structural Color", ACSNANO, vol. 9, No. 12, pp. 12158-12167, Dec. 22, 2015.

*Primary Examiner* — Kristina M Deherrera
(74) *Attorney, Agent, or Firm* — Lex IP Meister, PLLC

(57) ABSTRACT

Disclosed are an electrochromic photonic-crystal reflective display device and a method of manufacturing the same. The electrochromic photonic-crystal reflective display device includes a substrate having lower electrodes, a first solid polymer electrolyte thin film, a block copolymer photonic-crystal thin film, a second solid polymer electrolyte thin film, and upper electrodes. The first solid polymer electrolyte thin film is formed on the top of the substrate, and is made from a mixed solution including a polymer electrolyte and an ionic liquid. The block copolymer photonic-crystal thin film is formed on the top of the first solid polymer electrolyte thin film. The second solid polymer electrolyte thin film is formed on the top of the block copolymer photonic-crystal thin film, and is made from a mixed solution including a polymer electrolyte and an ionic liquid. The upper electrodes are formed on the top of the second solid polymer electrolyte thin film.

14 Claims, 30 Drawing Sheets

(52) U.S. Cl.
CPC ............... *G02F 2001/1515* (2013.01); *G02F 2001/1519* (2013.01); *G02F 2001/1552* (2013.01); *G02F 2202/32* (2013.01); *G02F 2203/02* (2013.01)

(58) Field of Classification Search
CPC .... G02F 1/1525; G02F 1/1521; G02F 1/1533; G02F 1/03; G02F 1/0316; G02F 2001/1515; G02F 2001/1519; G02F 2001/1552; G02F 2002/32; G02F 2203/02; C09K 9/02; B60R 1/088; H04N 9/3137; H04N 9/22
USPC ........ 359/265–275, 277, 245–247, 254, 242, 359/296
See application file for complete search history.

PRIOR ART $$\lambda = 2d(n^2_{eff} - \sin^2\theta)^{1/2}$$

PRIOR ART

PRIOR ART

PRIOR ART

ELECTROCHROMIC PHOTONIC-CRYSTAL REFLECTIVE DISPLAY DEVICE AND METHOD OF MANUFACTURING THE SAME

BACKGROUND

1. Technical Field

The present invention relates generally to a reflective display device and a method of manufacturing the reflective display device, and more particularly to an electrochromic photonic-crystal reflective display device and a method of manufacturing the electrochromic photonic-crystal reflective display device.

2. Description of the Related Art

Display devices may be classified into emissive display devices (e.g., an OLED display device, etc.) and reflective display devices (e.g., a photonic crystal display device, etc.). Photonic crystals have a structure in which two or more dielectric materials having different refractive indices are periodically repeated. Photonic crystals that exist in nature include opal, the wings of the Morpho menelaus butterflies, and the feathers of peacocks.

One-dimensional photonic crystals have a structure in which refractive indices are periodically repeated one-dimensionally, two-dimensional photonic crystals have a structure in which refractive indices are periodically repeated in the same plane, and three-dimensional photonic crystals have a structure in which a refractive index varies periodically in a three-dimensional space. FIG. 1 shows schematic diagrams of one-dimensional, two-dimensional, and three-dimensional photonic crystal structures.

According to the photonic crystal theory, the wavelength of reflected light is determined depending on the spacing between crystal lattices. Accordingly, when the spacing between crystal lattices is adjusted via various external stimuli, various colors of light can be obtained. Research into the application of the above phenomenon to display devices is being actively conducted. FIG. 2 is a schematic diagram showing Bragg-Snell reflection for crystal lattices.

Among photonic crystals based on organic materials, a block copolymer is a material that attracts the highest attention. A block copolymer can implement nano-structures, such as layered, cylindrical, and gyroid structures, using a phase separation phenomenon based on the interaction between polymers, can easily form a large area, and is suitable for the manufacture of a flexible device, which corresponds to the greatest advantage of a polymer material. FIG. 3 shows the states of the layered, cylindrical and gyroid nano-structures of a block copolymer (polystyrene-b-polyisoprene).

Various types of research into photonic crystals using a block copolymer have been conducted from the research mentioned in the paper published in the journal *Nature* in 2007. The wavelength area of reflected light is adjusted through the selective swelling of a P2VP layer via a layered structure using PS-b-P2VP (polystyrene-b-poly-2-vinylpyridine) and water. FIG. 4 is a schematic diagram of selective swelling via a PS-b-P2VP layered structure and water.

In the above-described research, a photonic crystal thin film is located in the state of being immersed in an aqueous solution. Based on the type of aqueous solution, the color of reflected light can be adjusted by selectively influencing the thickness and refractive index of one of the two different layers of photonic crystals. The changing of color using an aqueous solution has problems related to application to a display device and difficulty in manufacturing a flexible display device, which result from volatility and sealing problems.

Thereafter, first solid photonic crystals via an ionic liquid were implemented in the "macromolecules" paper. A solid photonic crystal device without a liquid was implemented by introducing an ionic liquid onto the top of a block copolymer photonic crystal via drop casting. Accordingly, problems, such as difficulty in manufacturing a flexible device, which results from volatility, inflammability, and sealing problems attributable to the use of a liquid electrolyte, could be overcome. FIG. 5 is a schematic diagram illustrating solid photonic crystals via an ionic liquid.

However, the conventional research simply implements solid block copolymer photonic crystals using an ionic liquid in the visible ray area, and is problematic in that the solid block copolymer photonic crystals do not exhibit the characteristics of an electrochromic device. Meanwhile, it is considerably difficult to implement a solid flexible block copolymer photonic crystal device that electrically reacts in response to low voltage and that is stable. The conventional research is also problematic in that it cannot implement solid flexible block copolymer photonic crystal device.

PRECEDING TECHNICAL DOCUMENTS

Patent Documents (Patent document 1) Korean Patent No. 10-0929340 (issued on Nov. 24, 2009)
(Patent document 2) Korean Patent No. 10-0952576 (issued on Apr. 5, 2010)

SUMMARY

An electrochromic photonic-crystal reflective display device and a method of manufacturing the electrochromic photonic-crystal reflective display device according to the present invention have the following objects:

First, an object of the present invention is to provide a solid photonic crystal reflective display device and a method of manufacturing the solid photonic crystal reflective display device, which use the cross-linking of block copolymers.

Second, an object of the present invention is to provide a solid block copolymer photonic-crystal reflective display device and a method of manufacturing the solid block copolymer photonic-crystal reflective display device, in which color is reversibly changeable by using electricity as an external stimulus.

Third, an object of the present invention is to provide a solid photonic crystal reflective display device and a method of manufacturing the solid photonic crystal reflective display device, in which adjustment in the visible ray area can be achieved through the mixture a polymer matrix and an ionic liquid and a flexible device can be implemented.

Fourth, an object of the present invention is to provide a reflective display device and a method of manufacturing the reflective display device, which can be innovatively used in organic electronic sensor and display fields in various manners.

Objects of the present invention are not limited to the above-described objects, and other objects that have not been described will be readily apparent to those skilled in the art from the following description.

In accordance with an aspect of the present invention, there is provided an electrochromic photonic-crystal reflective display device, including: a substrate configured to include lower electrodes; a first solid polymer electrolyte thin film formed on the top of the substrate, and made from a mixed solution including a polymer electrolyte and an ionic liquid; a block copolymer photonic-crystal thin film formed on the top of the first solid polymer electrolyte thin film; a second solid polymer electrolyte thin film formed on the top of the block copolymer photonic-crystal thin film, and made from a mixed solution including a polymer electrolyte and an ionic liquid; and upper electrodes formed on the top of the second solid polymer electrolyte thin film.

The color of reflected light may be adjusted according voltage applied to the lower electrodes and the upper electrodes.

The electrochromic speed of reflected light may be adjusted according to the thickness of the polymer electrolyte thin films.

The substrate may be a transparent electrode substrate that is an ITO substrate.

The polymer electrolyte may include a polymer electrolyte matrix and lithium ions.

The polymer electrolyte matrix may be at least any one of PVDF-TrFE, PS-b-PMMA-b-PS, PVDF-HFP, and PVDF-TrFE-CFE.

The lithium ions included in the polymer electrolyte may be any one of LiTFSI(Bis(trifluoromethane)sulfonimide lithium) and lithium trifluoroacetate.

In the polymer electrolyte thin films, the mixing ratio of the ionic liquid may be any one of 200 wt %, 300 wt %, 400 wt %, 600 wt %, 800 wt %, and 1200 wt % with respect to a polymer.

The block copolymer photonic-crystal thin film may have a layered structure including a selective swelling layer, and the selective swelling layer may be a QP2VP layer.

The block copolymer photonic-crystal thin film may be a photonic crystal thin film that is formed by subjecting a block copolymer thin film to quaternization and cross-linking.

The block copolymer photonic-crystal thin film may be formed by immersing a solvent-annealed block copolymer thin film in a solution in which bromoethane and dibromobutane are mixed in a predetermined ratio, and generating quaternization and cross-linking.

Bromoethane and dibromobutane may be mixed in the ratio at which the sum of bromoethane and dibromobutane is 20 vol % of hexane.

In the mixed solution, the mass ratio between dibromobutane and bromoethane may be any one of 0, 0.05, and 0.1, and 0 may mean that a dibromobutane content is zero.

In accordance with another aspect of the present invention, there is provided a method of manufacturing an electrochromic photonic-crystal reflective display device, the method including: (a) forming a block copolymer photonic-crystal thin film on the top of one substrate; (b) forming a first solid polymer electrolyte thin film on the top of the block copolymer photonic-crystal thin film by spin-coating the top of the block copolymer photonic-crystal thin film with a mixed solution including a polymer electrolyte and an ionic liquid; (c) separating the block copolymer photonic-crystal thin film and the first solid polymer electrolyte thin film, formed on the top of the one substrate, together from the one substrate, and turning over and then attaching the block copolymer photonic-crystal thin film and the first solid polymer electrolyte thin film so that the first solid polymer electrolyte thin film comes into contact with another substrate; (d) forming a second solid polymer electrolyte thin film on the top of the block copolymer photonic-crystal thin film having undergone step (c) by spin-coating the top of the block copolymer photonic-crystal thin film with a mixed solution including a polymer electrolyte and an ionic liquid; and (e) forming upper electrodes on the top of the second solid polymer electrolyte thin film.

The one substrate may be a silicon substrate, and the other substrate may be a transparent electrode substrate that is an ITO substrate.

Step (a) may include the steps of: (a1) forming a block copolymer thin film on the one substrate through spin coating; (a2) solvent-annealing the formed block copolymer thin film; and (a3) forming the block copolymer photonic-crystal thin film by subjecting the solvent-annealed block copolymer thin film to quaternization and cross-linking.

Step (a2) may be the step of annealing the block copolymer thin film by exposing the block copolymer thin film inside a container, in which chloroform solvent vapor has been saturated, for a predetermined period of time.

Step (a3) may include the steps of: immersing a solvent-annealed block copolymer thin film in a solution in which bromoethane and dibromobutane are mixed in a predetermined ratio; and forming the block copolymer photonic-crystal thin film by generating quaternization and cross-linking.

In the mixed solution, the mass ratio between dibromobutane and bromoethane may be any one of 0, 0.05, and 0.1, in which case 0 means that a dibromobutane content is zero.

The matrix of the polymer electrolyte may be at least any one of PVDF-TrFE, PS-b-PMMA-b-PS, PVDF-HFP, and PVDF-TrFE-CFE.

The mixing ratio of the ionic liquid may be any one of 200 wt %, 300 wt %, 400 wt %, 600 wt %, 800 wt %, and 1200 wt % with respect to a polymer.

In accordance with still another aspect of the present invention, there is provided a method of manufacturing an electrochromic photonic-crystal reflective display device, the method including the steps of: (a) forming a block copolymer photonic-crystal thin film on the top of one substrate; (b) forming a second solid polymer electrolyte thin film on the top of the block copolymer photonic-crystal thin film by spin-coating the top of the block copolymer photonic-crystal thin film with a mixed solution including a polymer electrolyte and an ionic liquid; (c) forming a first solid polymer electrolyte thin film on the top of another substrate by spin-coating the top of the other substrate with a mixed solution including a polymer electrolyte and an ionic liquid; (d) separating the block copolymer photonic-crystal thin film and the second solid polymer electrolyte thin film, formed on the one substrate, together from the one substrate, and attaching the block copolymer photonic-crystal thin film and the second solid polymer electrolyte thin film so that the block copolymer photonic-crystal thin film comes into contact with the first solid polymer electrolyte thin film formed on the other substrate; and (e) forming upper electrodes on the top of the second solid polymer electrolyte thin film.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
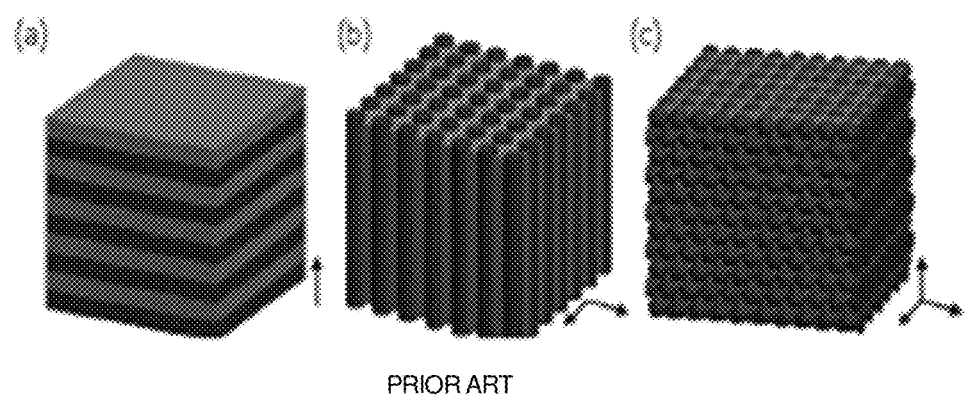
FIG. 1 shows schematic diagrams of one-dimensional, two-dimensional, and three-dimensional photonic crystal structures.
Figure 2:
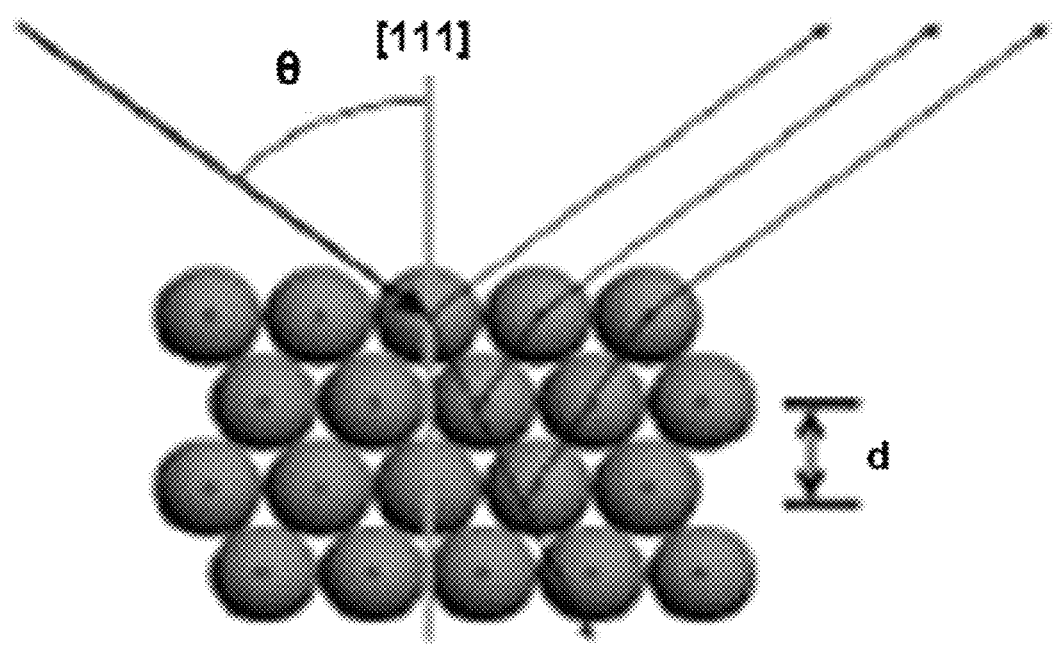
FIG. 2 is a schematic diagram showing Bragg-Snell reflection for crystal lattices.
Figure 3:
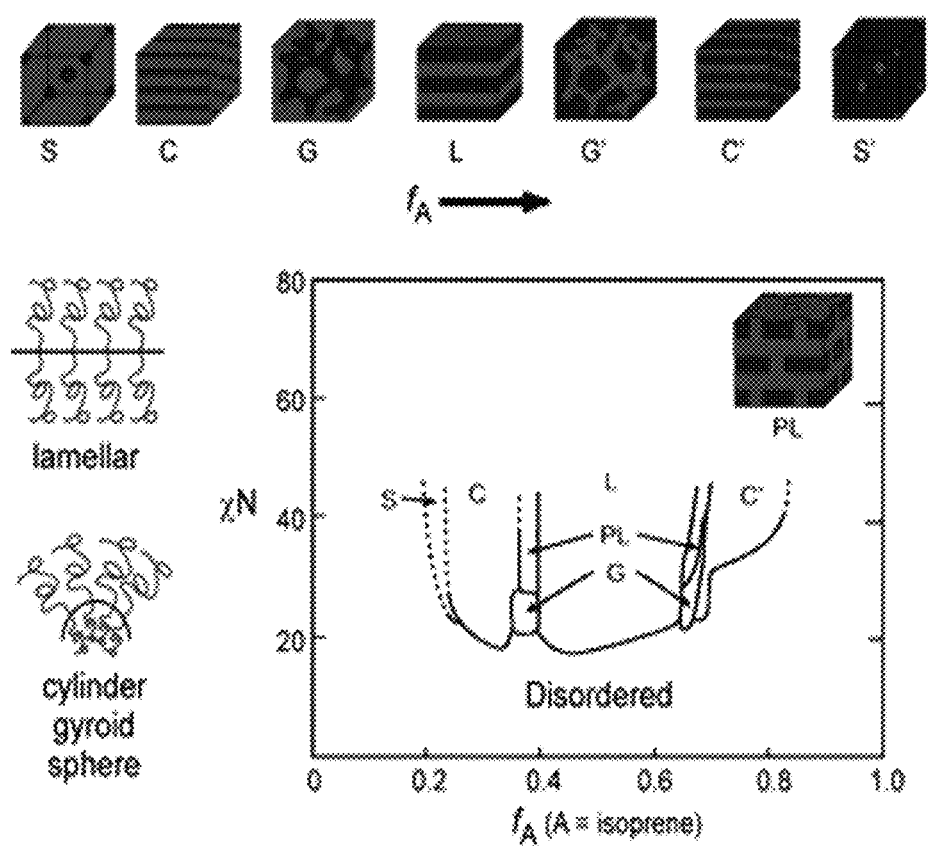
FIG. 3 shows the states of the layered, cylindrical and gyroid nano-structures of a block copolymer.
Figure 4:
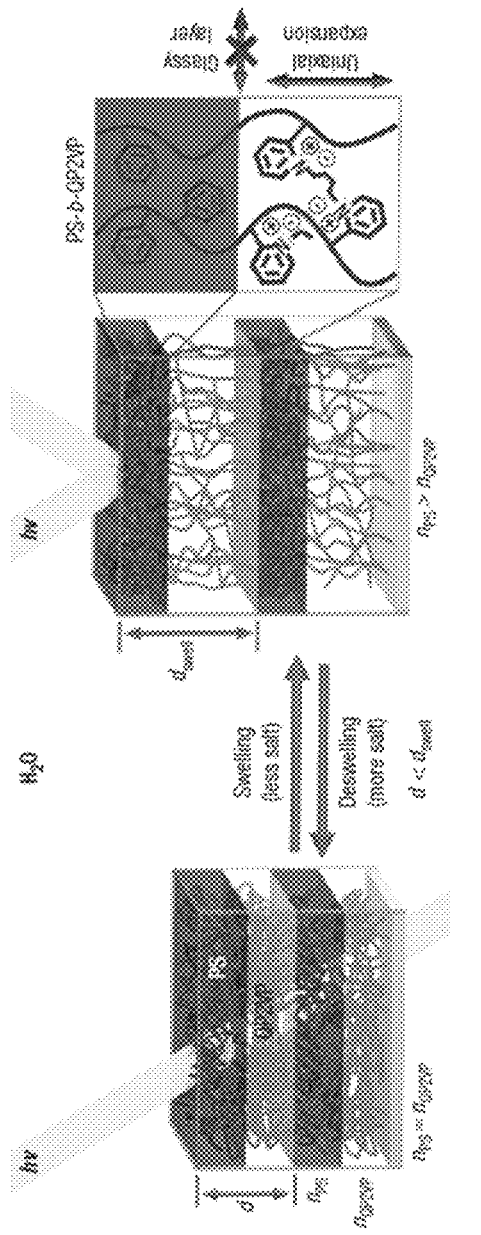
FIG. 4 is a schematic diagram of selective swelling via a PS-b-P2VP layered structure and water.
Figure 5:
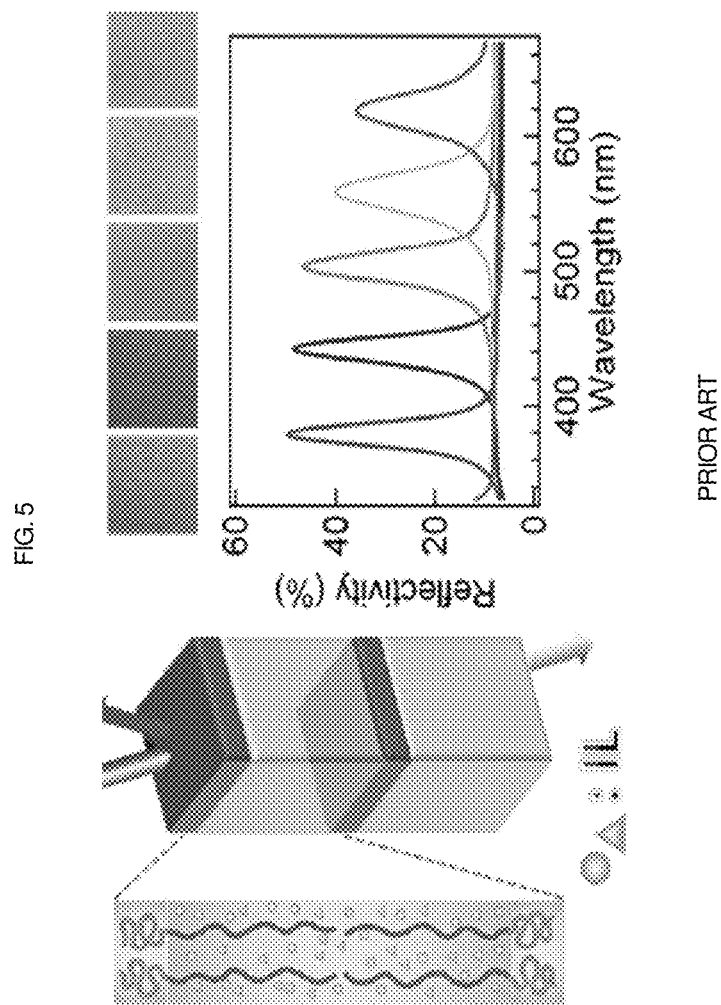
FIG. 5 is a schematic diagram illustrating solid photonic crystals via an ionic liquid.

Prior to the following detailed description of the present invention, it should be noted that the present invention may be subjected to various modifications and may have various embodiments. Accordingly, it should be understood that the present invention is not intended to be limited to specific embodiments described below and illustrated in the accompanying drawings but is intended to encompass all modifications, equivalents and substitutions that fall within the technical spirit and scope of the present invention.

When one component is described as being "connected" or "coupled" to another component, it should be understood that the one component may be directly connected or coupled to the other component or a third component may be present between the two components. In contrast, when one component is described as being "directly connected" or "directly coupled" to another component, it should be understood that a third component is not present between the two components.

The terms used herein are used merely to describe specific embodiments, and are not intended to limit the present invention. A singular expression may include a plural expression unless otherwise defined. In this application, the terms "comprise," "include," "comprising," and "including" and their derivatives are used to designate the presence of one or more features, numbers, steps, operations, components, parts or combinations thereof described in the specification, and should not be understood as excluding the presence or probability of addition of one or more different features, numbers, steps, operations, components, parts or combinations thereof.

Furthermore, the term " . . . part", " . . . unit", or " . . . module" may refer to a unit component that processes at least one function or operation.

In the following description that will be given in conjunction with the accompanying drawings, the same reference numerals will be assigned to the same components throughout the accompanying drawings, and redundant descriptions of the same components will be omitted. In the following description of the present invention, a detailed description of a related well-known technology will be omitted when it is determined that the detailed description may make the gist of the present invention unnecessarily obscure.

Embodiments of the present invention will be described in detail with reference to the accompanying drawings.

Figure 6:
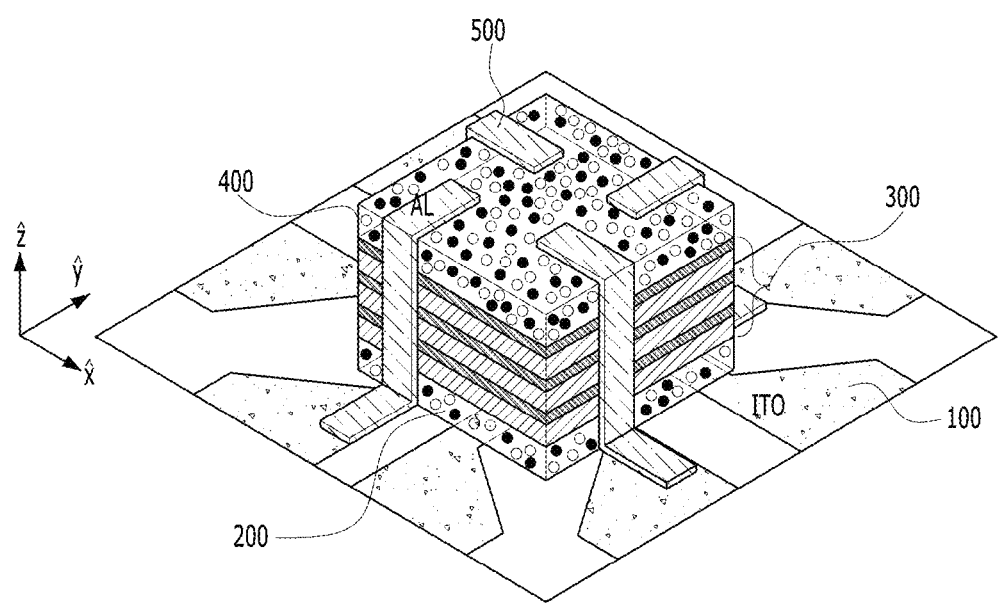
FIG. 6 is a perspective view of an electrochromic photonic-crystal reflective display device according to an embodiment of the present invention.
Figure 7:
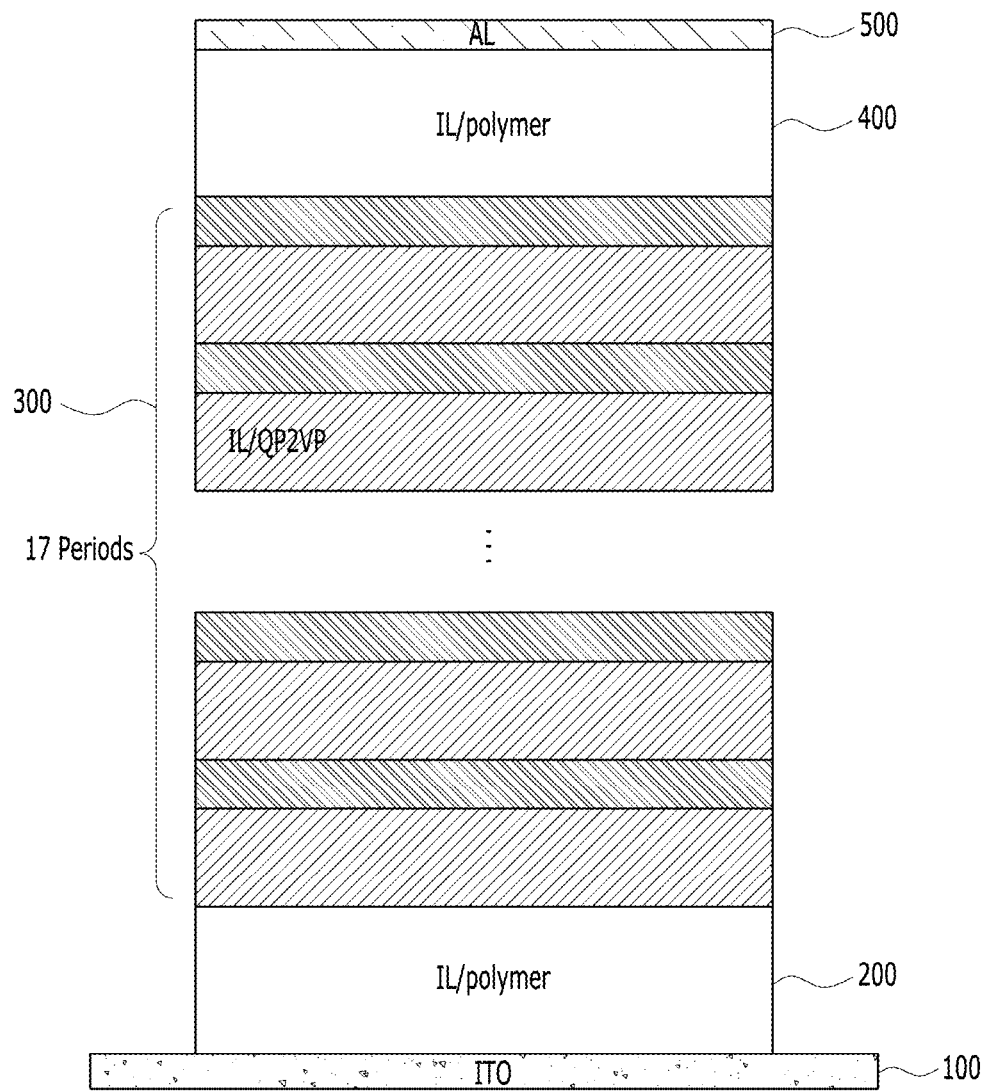
FIG. 7 is a sectional view of the electrochromic photonic-crystal reflective display device according to the embodiment of the present invention.
Figure 8:
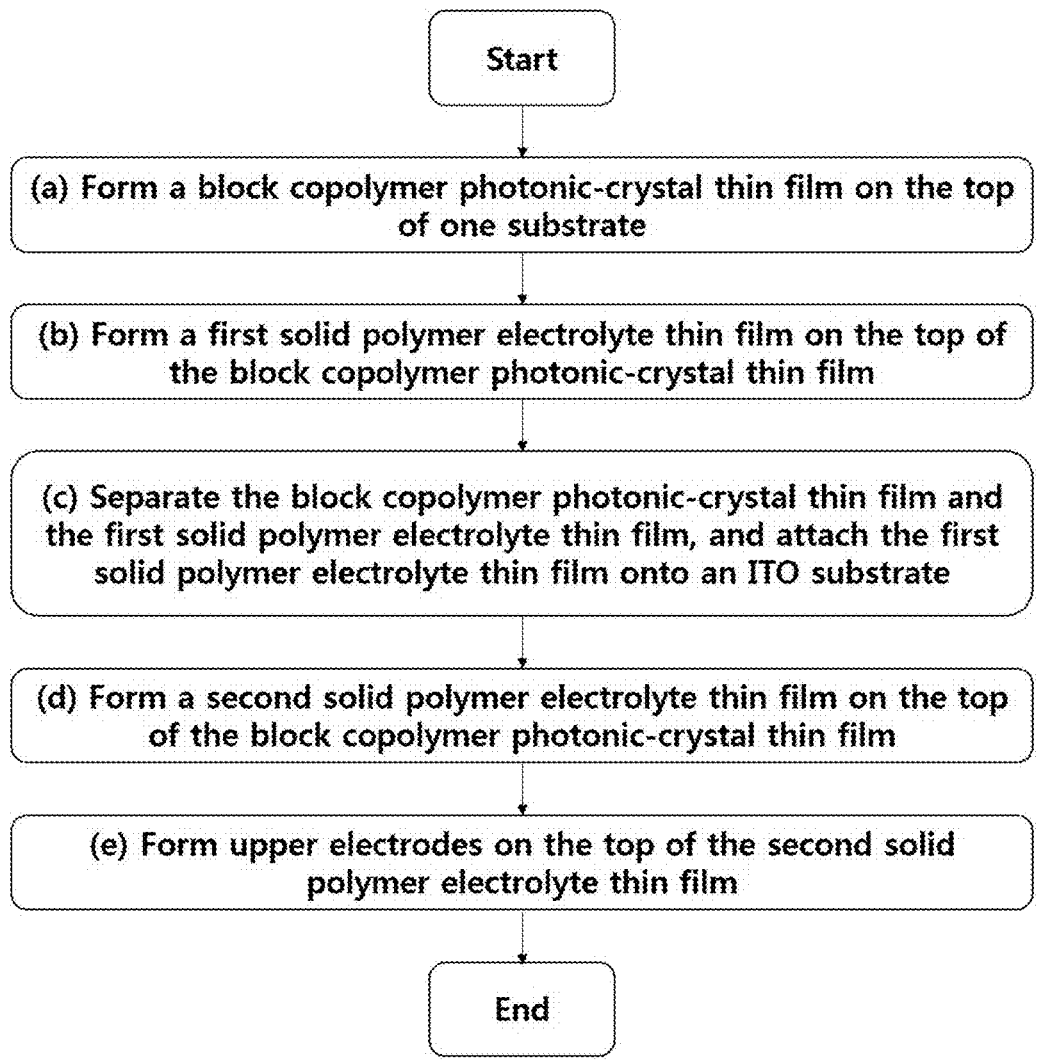
FIG. 8 is a flowchart illustrating the flow of a method of manufacturing an electrochromic photonic-crystal reflective display device according to another embodiment of the present invention.

FIG. 6 is a perspective view of an electrochromic photonic-crystal reflective display device according to an embodiment of the present invention, FIG. 7 is a sectional view of the electrochromic photonic-crystal reflective display device according to the embodiment of the present invention, and FIG. 8 is a flowchart illustrating the flow of a method of manufacturing an electrochromic photonic-crystal reflective display device according to another embodiment of the present invention.

As shown in FIGS. 6 and 7, the present invention relates to an electrochromic photonic-crystal reflective display device. The electrochromic photonic-crystal reflective display device includes: a substrate 100 configured to include lower electrodes; a first solid polymer electrolyte thin film 200 formed on the top of the substrate, and made from a mixed solution including a polymer electrolyte and an ionic liquid;

a block copolymer photonic-crystal thin film 300 formed on the top of the first solid polymer electrolyte thin film; a second solid polymer electrolyte thin film 400 formed on the top of the block copolymer photonic-crystal thin film, and made from a mixed solution including a polymer electrolyte and an ionic liquid; and upper electrodes 500 formed on the top of the second solid polymer electrolyte thin film.

As described above, the photonic-crystal reflective display device according to the embodiment of the present invention proposes an electrochromic solid block copolymer photonic-crystal reflective display device in which mixed layers of an ionic liquid and a polymer matrix are located over and beneath a block copolymer layered structure by forming a sandwich structure in which the block copolymer photonic-crystal thin film 300 is surrounded by polymer matrices.

Furthermore, as shown in FIG. 8, a method of manufacturing a reflective display device according to a first embodiment of the present invention includes the steps of: (a) forming a block copolymer photonic-crystal thin film on the top of one substrate; (b) forming a first solid polymer electrolyte thin film on the top of the block copolymer photonic-crystal thin film by spin-coating the top of the block copolymer photonic-crystal thin film with a mixed solution including a polymer electrolyte and an ionic liquid;

(c) separating the block copolymer photonic-crystal thin film and the first solid polymer electrolyte thin film, formed on the top of the one substrate, together from the one substrate, and turning over and then attaching the block copolymer photonic-crystal thin film and the first solid polymer electrolyte thin film so that the first solid polymer electrolyte thin film comes into contact with another substrate; (d) forming a second solid polymer electrolyte thin film on the top of the block copolymer photonic-crystal thin film having undergone step (c) by spin-coating the top of the block copolymer photonic-crystal thin film with a mixed solution including a polymer electrolyte and an ionic liquid; and (e) forming upper electrodes on the top of the second solid polymer electrolyte thin film.

Step (c) according to the first embodiment of the present invention is described using one substrate (a silicon substrate) and another substrate (an ITO substrate) as examples, as follows. According to a sequence formed through steps (a) and (b), the photonic crystal thin film 300 is located on the top of the one substrate (the silicon substrate), and the solid polymer electrolyte thin film 200 is located on the top of the photonic crystal thin film 300. That is, the sequence "the silicon substrate→the photonic crystal thin film 300→the solid polymer electrolyte thin film 200" is formed. Thereafter, the photonic crystal thin film 300 and the solid polymer electrolyte thin film 200 are separated from the silicon substrate, turned over and then attached to the ITO substrate 100 through physical transfer. As a result, a disposition structure based on the sequence "the ITO substrate 100→the solid polymer electrolyte thin film 200→the photonic crystal thin film 300" is obtained.

Step (d) according to the first embodiment of the present invention is the step of, after the change to the above disposition structure, i.e., after the performance of step (c), additionally forming a solid polymer electrolyte thin film 400 on the top of the photonic crystal thin film 300.

A method of manufacturing a reflective display device according to a second embodiment of the present invention includes the steps of: (a) forming a block copolymer photonic-crystal thin film on the top of one substrate; (b) forming a second solid polymer electrolyte thin film on the top of the block copolymer photonic-crystal thin film by spin-coating the top of the block copolymer photonic-crystal thin film with a mixed solution including a polymer electrolyte and an ionic liquid; (c) forming a first solid polymer electrolyte thin film on the top of another substrate by spin-coating the top of the other substrate with a mixed solution including a polymer electrolyte and an ionic liquid; (d) separating the block copolymer photonic-crystal thin film and the second solid polymer electrolyte thin film, formed on the one substrate, from the one substrate, and attaching the block copolymer photonic-crystal thin film and the second solid polymer electrolyte thin film so that the block copolymer photonic-crystal thin film comes into contact with the first solid polymer electrolyte thin film formed on the other substrate; and (e) forming upper electrodes on the top of the second solid polymer electrolyte thin film.

The structures that are finally implemented by the methods according to the first and second embodiments of the present invention all correspond to a sandwich structure in which polymer electrolyte thin films are disposed on the top and bottom of a block copolymer photonic-crystal thin film, respectively (see FIG. 7). These two embodiments are the same as each other in that the block copolymer photonic-crystal thin film 300 and the polymer electrolyte thin film 200 are stacked on the top of the one substrate, but are different from each other in that in the case of the first embodiment, the stacked structure is turned over and then attached to the other substrate while in the case of the second embodiment, the stacked structure is attached to the other substrate without any change. The reason for this is that in the case of the second embodiment, the polymer electrolyte thin film has been already formed on the other substrate.

According to the present invention, it is preferred that the one substrate is a silicon substrate and the other substrate is a transparent electrode substrate, i.e., an ITO substrate.

Furthermore, the embodiments of the present invention propose a reflective display device in which the solid photonic crystal thin film 300 is formed using a mixture of a polymer electrolyte and an ionic liquid, which is unlike a conventional display device using a photonic crystal structure in which a liquid electrolyte is used. This can completely do away with sealing, which must be performed because a solvent is volatile, and limitations to the implementation of a flexible device.

In this case, the solid polymer electrolyte refers to an electrolyte in which ions dissociated through the addition of a salt to a polymer including elements, such as oxygen, sulfur, nitrogen and the like, move within the polymer. The ionic liquid refers to an ionic salt that is present in a liquid state at a temperature equal to or lower than 100° C. Since the ionic liquid is composed of positive ions and negative ions, unlike a liquid composed of molecules in an electrically neutral state, the ionic liquid is being widely used as an electrolyte solvent.

In the embodiments of the present invention, a mixture of a polymer electrolyte and an ionic liquid is applied to photonic crystals. The solid polymer electrolyte layer is simply formed in a "polymer in salt" structure in which a polymer is included in an ionic liquid by using a spin-coating method. A large area, nonflammable, nonvolatile device that could not have been implemented using a liquid electrolyte-based device due to the problem of sealing can be provided. Furthermore, the applicability of the present invention to a flexible device, which corresponds to one of the greatest advantages of organic material, is high.

Furthermore, the embodiments of the present invention provide a block copolymer photonic crystal device that can reversibly change color using electricity as external stimuli and a method of manufacturing the block copolymer photonic crystal device. The reflective display devices in which the block copolymer photonic-crystal thin film 300 is formed between the solid polymer electrolyte thin films, i.e., mixed layers of a polymer matrix and an ionic liquid, exhibit a change between red and green in response to a low voltage of 3V. The above-described display devices according to the embodiments of the present invention are applicable to organic electronic sensor and display fields in various manners in the future.

It is preferred that the block copolymer photonic-crystal thin film according to the present invention has a layered structure including a selective swelling layer and the selective swelling layer is a QP2VP layer.

In the present invention, the term "swelling" also means deswelling after swelling. That is, the selective swelling layer undergoes swelling and deswelling.

An electrochromic photonic-crystal reflective display device and a method of manufacturing the electrochromic photonic-crystal reflective display device according to embodiments of the present invention will be described in detail below with reference to the accompanying drawings via experimental examples:

1. Experiment Method
(1) Experimental Material
A. PS-b-P2VP

Polystyrene-b-poly(2-vinylpyridine) (Ps-b-P2VP) that was used to produce one-dimensional block copolymer photonic crystals was synthesized in an external laboratory. The molecular weights of PS and P2VP that were used in the invention are 95,000 g/mol and 105,000 g/mol, respectively.

B. PVDF-TrFE

Poly(vinylidene fluoride-co-trifluoroethylene) (PVDF-TrFE) including 25 wt % of TrFE was used as the matrix of a solid polymer electrolyte, and the melting temperature $T_m$ and curie temperature $T_c$ of PVDF-TrFE were 160° C. and 80° C., respectively.

C. PS-b-PMMA-b-PS

Poly(styrene-block-methylmethacrylate-block-styrene) (PS-PMMA-PS), i.e., a three-block copolymer, was used as the matrix of a solid polymer electrolyte, and the molecular weights of PS and PMMA were 6,000 g/mol and 3,000 g/mol, respectively.

D. PVDF-HFP

Poly(vinylidene fluoride-hexafluoropropylene) (PVDF-HFP) was used as the matrix of a solid polymer electrolyte, and the molecular weights of PVDF and HFP were 130,000 g/mol and 400,000 g/mol, respectively.

E. PVDF-TrFE-CFE

Poly(vinylidene fluoride trifluoroethylenechlorofluoroethylene) (PVDF-TrFE-CFE) was used as the matrix of a solid polymer electrolyte, and the ratio among PVDF, TrFE and CFE was 59.4:33.4:7.3.

F. LiTFSI

Bis(trifluoromethane)sulfonimide lithium (LiTFSI) was used as lithium ions used for the solid polymer electrolyte, in which case Tm of LiTFSI ranged from 234 to 238° C.

G. Preparation of PS-b-P2VP Solution

In order to form the one-dimensional photonic crystal thin film 300 using a block copolymer thin film, a PS-b-P2VP block copolymer solution was prepared. The concentration of the solution was set to 7 wt %, and a PS-b-P2VP block copolymer was dissolved in PGMEA, i.e., an organic solvent. Immediately after quantification using a scale, the PS-b-P2VP block copolymer was dissolved in PGMEA on a hot plate, whose temperature was set to 50° C., at a speed of 300 rpm for 6 hours or more, and then filtering was performed, resulting in the solution.

H. Preparation of Solid Polymer Electrolyte Solution

PVDF-TrFE, PS-b-PMMA-b-PS, and PVDF-HFP were used as the materials of polymer matrices in the solid polymer electrolytes, and acetonitrile, i.e., an organic solvent, was used to prepare a solution. A polymer and an organic solvent were melted on a hot plate, whose temperature was set to 50° C., at a speed of 300 rpm for six hours or more, and then ionic liquids having weight percentages of 200 wt %, 300 wt % and 1200 wt % with respect to a polymer were provided in order to observe changes in the photonic band gap of photonic crystals based on the ratios between an ionic liquid and a polymer matrix. All the solutions were used through sonication and melting on a hot plate, whose temperature was set to 50° C., for 30 minutes or more.

(2) Fabrication of Specimen

In an electrochromic photonic-crystal reflective display device according to an embodiment of the present invention, the basic unit layered structure "a block copolymer photonic-crystal thin film 300/a solid polymer electrolyte thin film" is formed in order to form a sandwich structure in which a photonic crystal thin film 300 is located between solid polymer electrolyte thin films. A process of fabricating a specimen having the basic unit structure "a block copolymer photonic-crystal thin film 300/a solid polymer electrolyte thin film" will be described below.

A. Formation of Block Copolymer Photonic-crystal Thin Film 300 (Step (a))

Formation of PS-b-P2VP Block Copolymer Thin Film

To fabricate a PS-b-P2VP polymer thin film, a sufficient amount of solution was dropped on a substrate loaded into a spin coater, and was immediately rotated at a speed of 500 rpm for 60 seconds and at a speed of 2000 rpm for 60 seconds, i.e., a total of 120 seconds. During the rotation at a speed of 500 rpm, the thickness of the thin film was determined. During the rotation at a speed of 2000 rpm, a residual solution remaining on the corners of the substrate was spread thinly, and thus a uniform block copolymer thin film was formed.

Solvent Annealing of PS-b-P2VP Block Copolymer Thin Film

In an embodiment of the present invention, to form a PS-b-P2VP block copolymer thin film, disorderedly arranged on a substrate, into a uniform nano-structure, solvent annealing was applied. The spin-coated block copolymer thin film was fixed in a container in which solvent vapor was saturated, and was exposed for a day. The solvent used in the embodiment of the present invention was chloroform, and the temperature inside the container was fixed to 50° C. The solvent-annealed block copolymer polymer thin film was taken out of the container, and was stored for a sufficient time inside a laboratory hood so that remaining organic solvent could be sufficiently volatilized.

Quaternization and Cross-linking of PS-b-P2VP Block Copolymer Thin Film

The solvent-annealed block copolymer polymer thin film was immersed in a solution in which bromoethane and dibromobutane were mixed in a predetermined ratio, and was reacted under a temperature condition of 50° C. for a day, which was performed based on the mass ratio between dibromobutane and bromoethane.

In this case, dibromobutane generated cross-linking that acted to link nitrogen atoms of the pyridine groups of different pieces of P2VP. Furthermore, quaternization that acted to convert pyridine, in which only a bromoethane P2VP layer was selectively neutral, into pyridinium having positive charge was generated.

The swelling of the P2VP layer increased via quaternization, and a photonic band gap was formed in the visible ray area. As the ratio of dibromobutane increased, the degree of swelling decreased. Although the same ionic liquid was injected, the spacing between lattices varied. A block copolymer photonic-crystal thin film 300 in which the cross-linking of polymer chains and quaternization have been completed was taken out of a solution, and was stored for a predetermined time inside a laboratory hood so that remaining solution could be sufficiently evaporated. The sum of bromoethane and dibromobutane was made to be 20 vol % of hexane.

B. Formation of Upper Solid Polymer Electrolyte Thin Film (Step (b) or Step (d))

The formed block copolymer photonic-crystal thin film 300 was loaded into a spin coater, a mixed solution of a solid polymer electrolyte and an ionic liquid was dropped on the formed block copolymer photonic-crystal thin film 300, and the formed block copolymer photonic-crystal thin film 300 and the mixed solution were rotated at a speed of 2000 rpm for 60 seconds. Solid polymer electrolyte thin films were formed based on concentrations of 200 wt %, 400 wt %, 600 wt %, and 800 wt %.

C. Formation of Electrochromic Photonic-crystal Reflective Display Device

The solid polymer electrolyte thin film, i.e., the upper mixed layer of an ionic liquid and a polymer, and the block copolymer photonic-crystal thin film 300 present below the solid polymer electrolyte thin film were separated from the silicon substrate, were turned over, and were then transferred to the ITO substrate 100 (steps (a), (b), and (c)). In this case, the ITO substrate 100 was a transparent electrode substrate having a pattern size of 3 mm. Thereafter, the mixed layer of an ionic liquid and a polymer matrix was dropped on the top of the block copolymer photonic-crystal thin film 300 and the solid polymer electrolyte thin film, a solid polymer electrolyte thin film was formed through rotation at a speed of 2000 rpm (step (d)), and then metal electrodes using aluminum were formed to a thickness of 70 nm through vacuum thermal deposition (step (e)), thereby fabricating the reflective display device having a photonic crystal structure according to an embodiment of the present invention.

(3) Analysis Method

A. SAXS

SAXS equipment was used to observe the internal nanostructure of the PS-b-P2VP polymer thin film. By using the above equipment, it was observed that the polymer thin film formed a one-dimensional layered structure.

B. SEM (Scanning Electron Microscope)

An SEM was used to observe the surface nano-structure and thin film section of the PS-b-P2VP polymer thin film. The thickness of the overall device including the ionic liquid, the polymer matrix and the block copolymer photonic crystals was measured via a sectional image.

C. US-VIS Spectrometer

A US-VIS spectrometer was used to investigate the location of the photonic band gap of block copolymer-based photonic crystals. The shift of the photonic band gap based on the mixing ratios of a polymer matrix and an ionic liquid was observed. The reflectance of the photonic crystals was measured in a measurement region at a scanning speed of 2 nm per second.

2. Experimental Results and Discussion (1) Structure of Block Copolymer Photonic Crystals and Implementation of Colors in Visible Ray Area Measurement of Reflectance of Solid Block Copolymer Photonic-Crystal Thin Film 300

Figure 9:
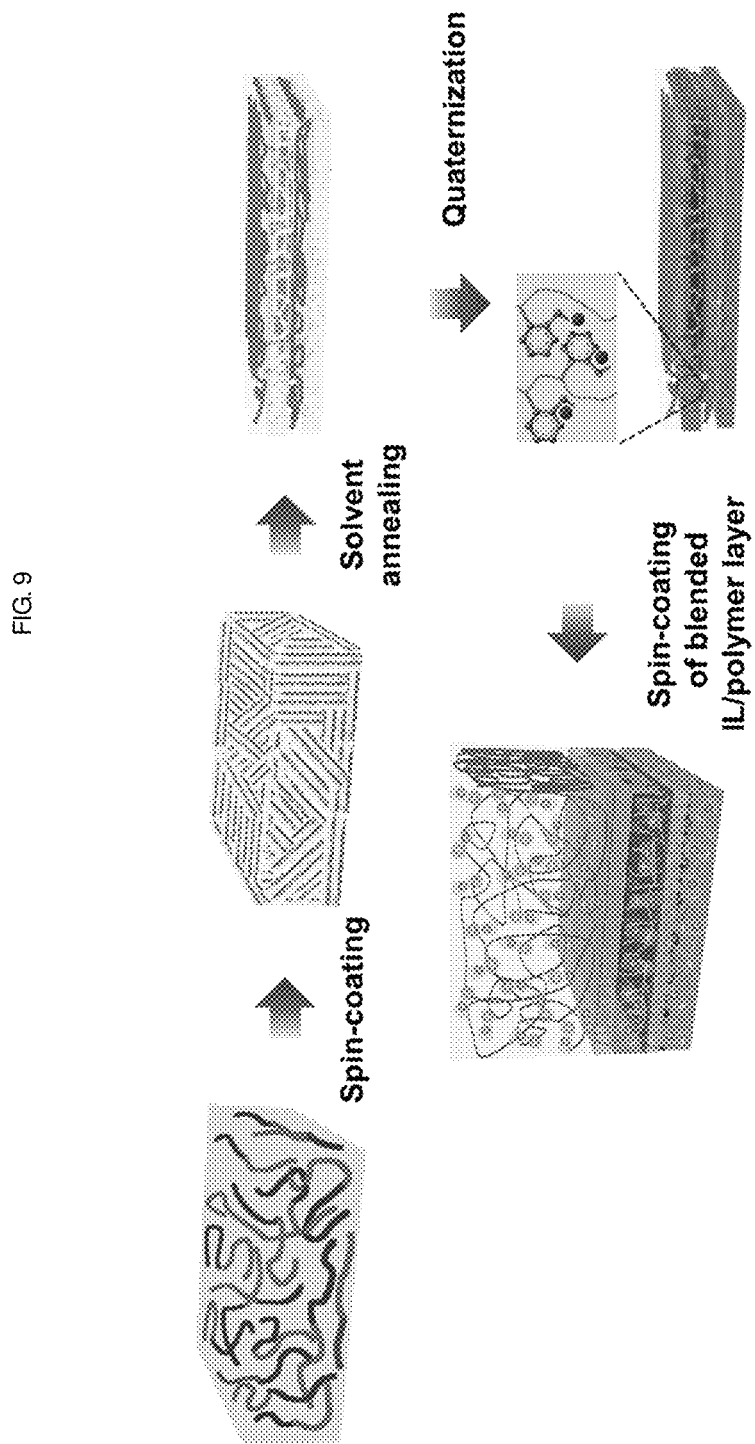
FIG. 9 is a schematic diagram showing a process of manufacturing a block copolymer (PS-b-P2VP) photonic-crystal thin film that is applied to an electrochromic photonic-crystal reflective display device according to an embodiment of the present invention.

FIG. 9 is a schematic diagram showing a process of manufacturing the photonic crystal thin film 300 that is applied to an electrochromic photonic-crystal reflective display device according to an embodiment of the present invention.

As shown in FIG. 9, the PS-b-P2VP block copolymer was dissolved in propylene glycol monomethyl ether acetate (PGMEA) to prepare a solution. Thereafter, a thin film was formed through spin coating, and was subjected to solvent annealing using chloroform vapor for 24 hours, thereby forming a one-dimensional layered structure parallel to a substrate. Thereafter, quaternization was performed by selectively making the nitrogen atoms of the P2VP region electrical positive using bromoethane in order to allow ionic liquid molecules to easily move. Finally, a mixed solution of an ionic liquid and a polymer matrix was dropped on the structure, and spin coating was performed, thereby implementing a solid block copolymer photonic-crystal thin film 300.

Figure 10:
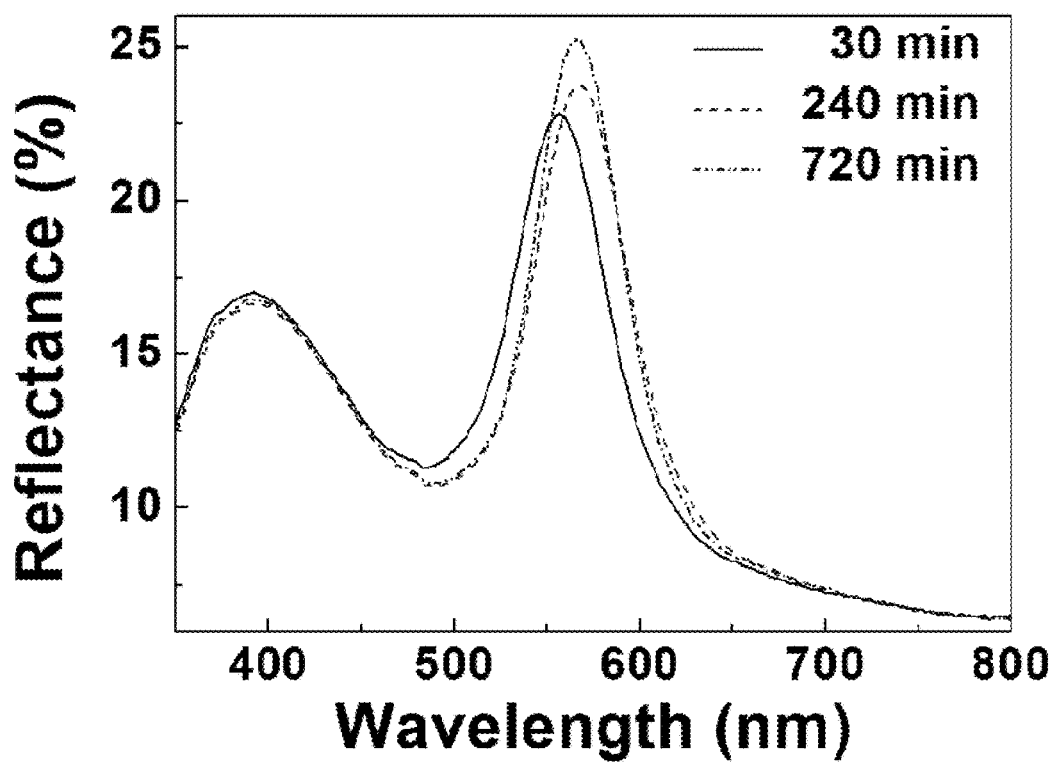
FIG. 10 shows results obtained by measuring the reflectance of the block copolymer photonic-crystal thin film 300 using a PVDF-TrFE polymer matrix over time after coating.
Figure 11:
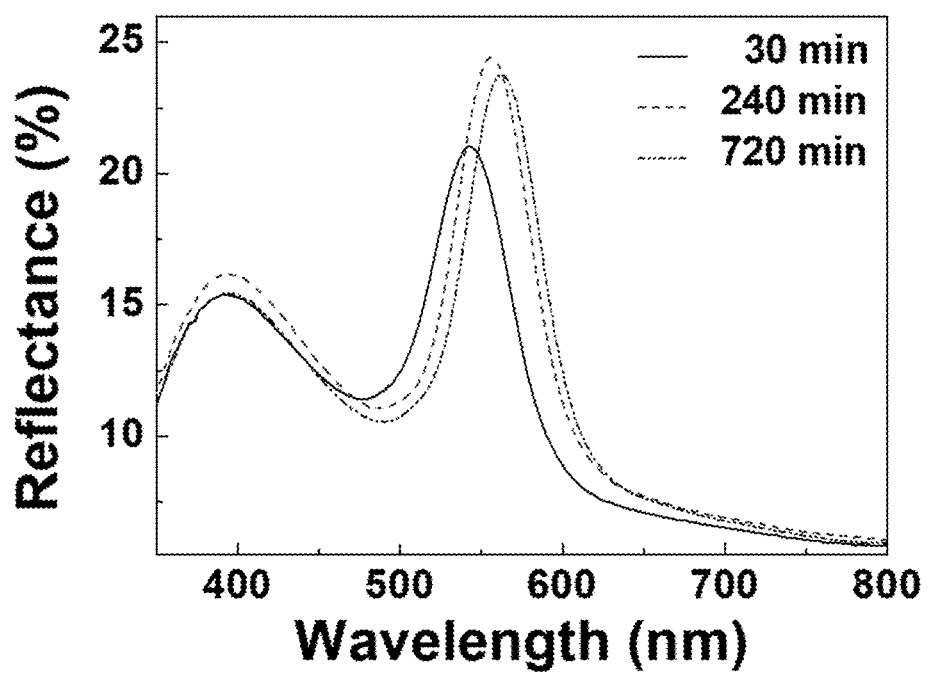
FIG. 11 shows results obtained by measuring the reflectance of the block copolymer photonic-crystal thin film 300 using a PVDF-HFP polymer matrix over time after coating.
Figure 12:
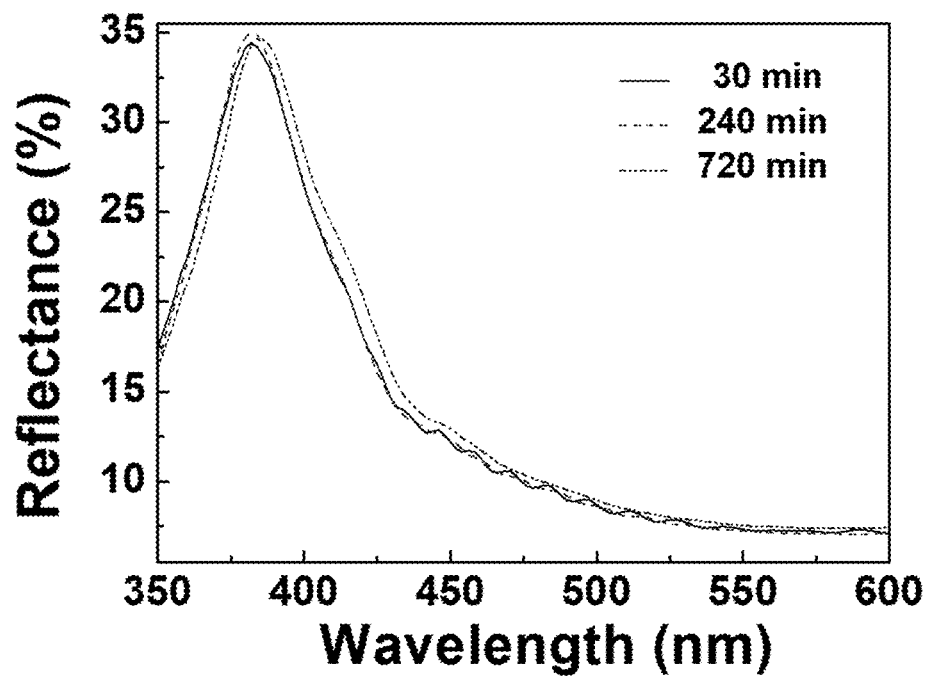
FIG. 12 shows results obtained by measuring the reflectance of the block copolymer photonic-crystal thin film 300 using a PS-PMMA-PS polymer matrix over time after coating.

According to embodiments of the present invention, FIG. 10 shows results obtained by measuring the reflectance of the block copolymer photonic-crystal thin film 300 using a PVDF-TrFE polymer matrix, FIG. 11 shows results obtained by measuring the reflectance of the block copolymer photonic-crystal thin film 300 using a PVDF-HFP polymer matrix, and FIG. 12 shows results obtained by measuring the reflectance of the block copolymer photonic-crystal thin film 300 using a PS-PMMA-PS polymer matrix.

Figure 13:
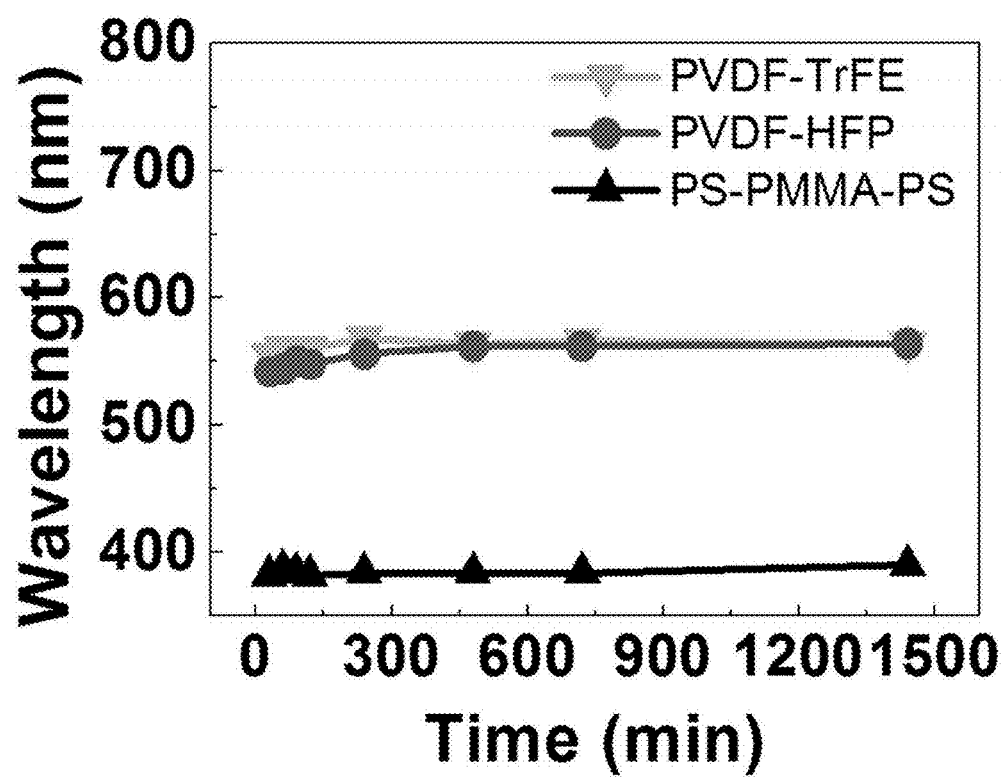
FIG. 13 is a graph plotting wavelengths exhibiting maximum reflectance over time in each of the photonic crystal thin films according to the embodiments of FIGS. 10 to 12.

As shown in FIGS. 10 to 13, in an embodiment of the present invention, a solid visible ray area block copolymer photonic crystal using a mixed layer of an ionic liquid and a polymer matrix implemented the block copolymer photonic-crystal thin films 300 via three types of polymer matrices, i.e., poly(styrene-block-methyl methacrylate-blockstyrene) (PS-b-PMMA-b-PS), poly(vinylidene fluorideco-hexafluoropropylene) (PVDF-HFP), and poly(vinylidene fluoride-co-trifluoroethylene) (PVDF-TrFE), and the reflectance of the thin films was measured. Furthermore, the result values of the reflectance are shown for PVDF-TrFE (see FIG. 10), PVDF-HFP (see FIG. 11), and PS-PMMA-PS (see FIG. 12) over time. The three types of photonic crystal thin films 300 exhibited desirable stability over time. FIG. 13 is a graph showing wavelengths exhibiting maximum reflectance over time in each of the photonic crystal thin films 300. As a result, it was found that PVDF-TrFE, i.e., a fluorinate copolymer, was the most effective.

Changes in Structural Color Based on Ratios of Ionic Liquid

FIGS. 14 to 18 are diagrams showing changes in structural color based on the ratios of the ionic liquid of the block copolymer photonic-crystal thin film 300 according to embodiments of the present invention.

Figure 14:
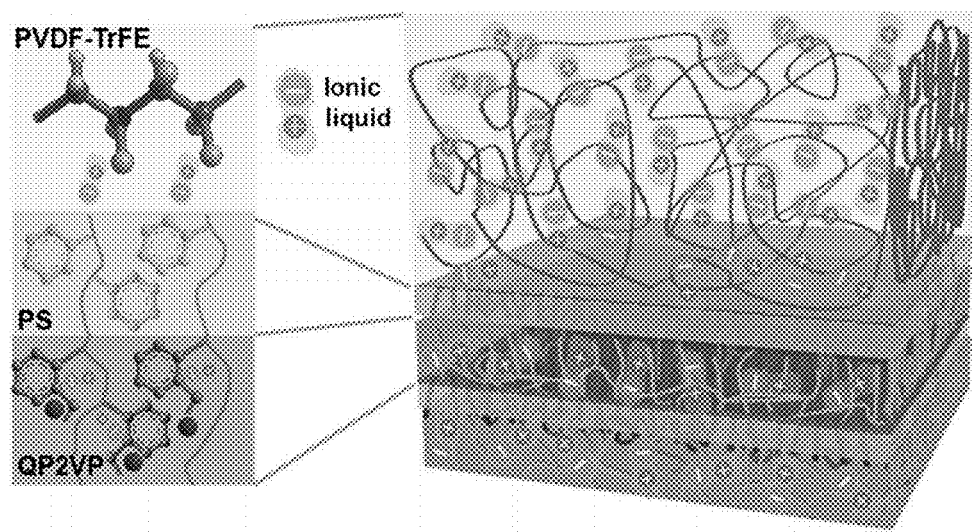
FIG. 14 is a drawing showing the overall structure of block copolymer photonic crystals as well as a polymer matrix layer according to the present invention.
Figure 15:
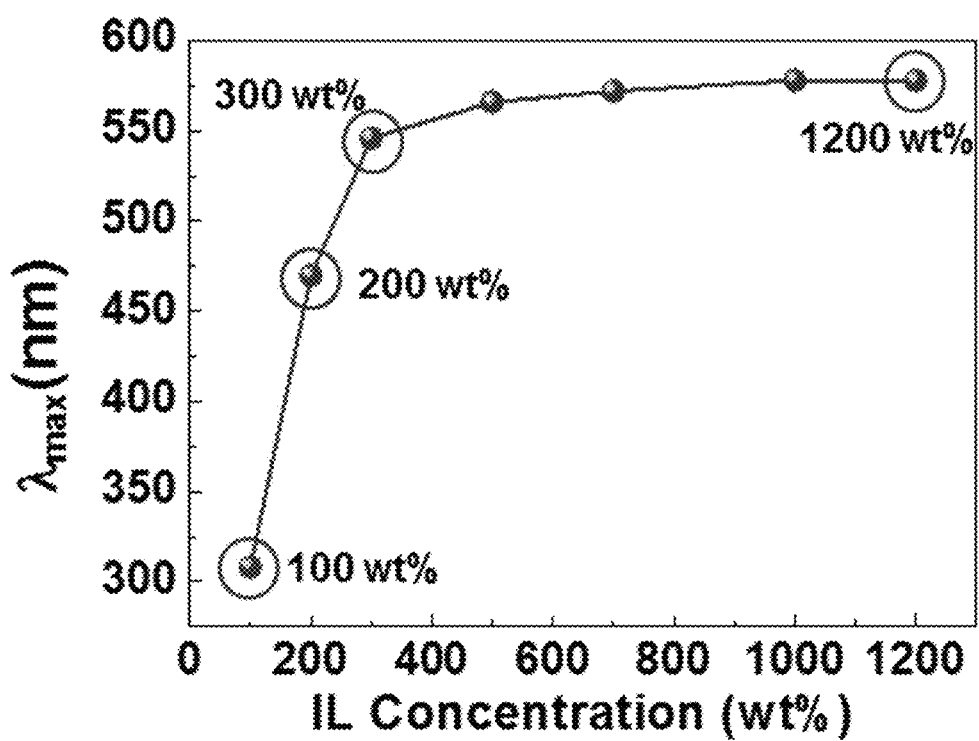
FIGS. 15 and 16 are graphs plotting changes in the structural color of a block copolymer photonic-crystal thin film according to an embodiment of the present invention based on the ratios of ionic liquids.

In this case, FIG. 14 is a drawing showing the structure of solid block copolymer photonic crystals on a silicon substrate. The structure of a polymer matrix shows a shape in which PVDF-TrFE monomers are regularly repeated, and PS-b-QP2VP also coexists with an ionic liquid. FIG. 15 is a graph showing wavelengths having maximum reflectance in an equilibrium state based on the mixing ratios between the ionic liquid and polymer matrix of an upper layer. The degree of the swelling of a QP2VP area increased as the concentration of an ionic liquid increased. This could be seen from the red shift of reflected wavelengths. This indicates that all the R, G and B colors of the visible ray area were implemented via the contents of the ionic liquid.

Figure 16:
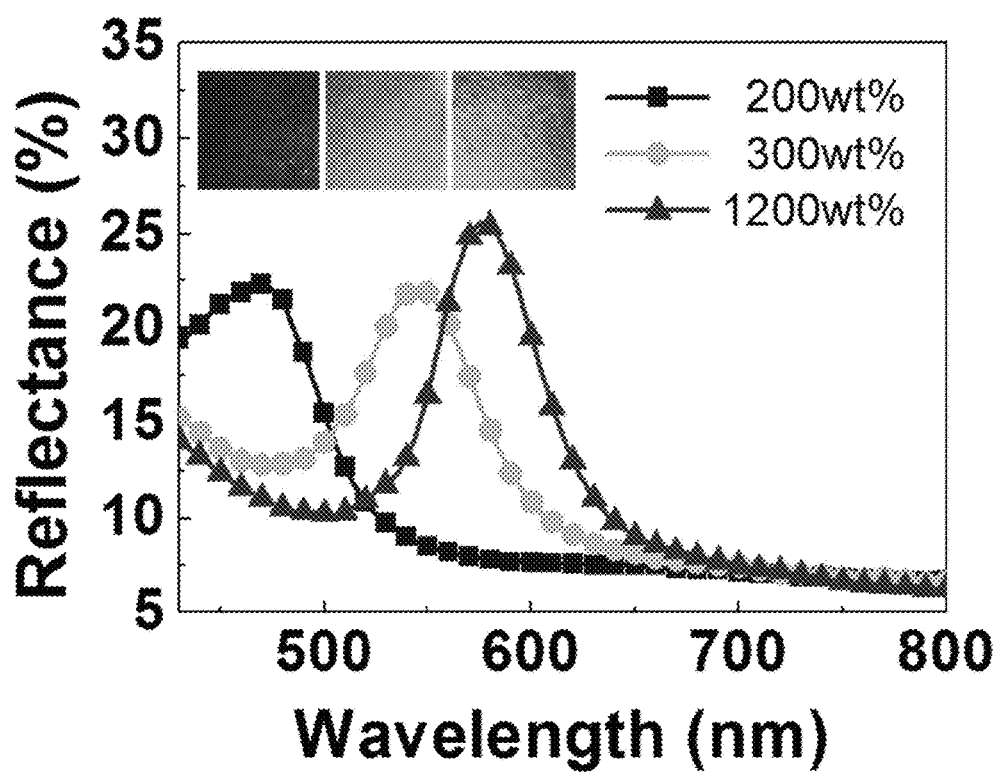
Figure 17:
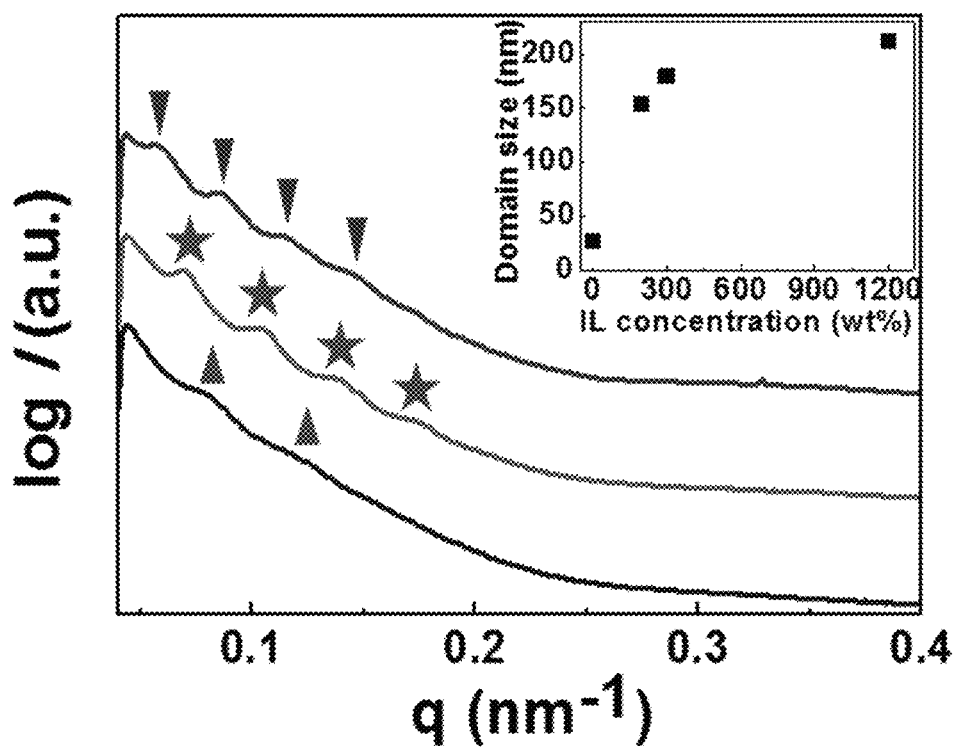
FIG. 17 is a graph plotting changes in the domain size of an inner layered structure based on ionic liquid contents that are analyzed via a GISAXS image.
Figure 18:
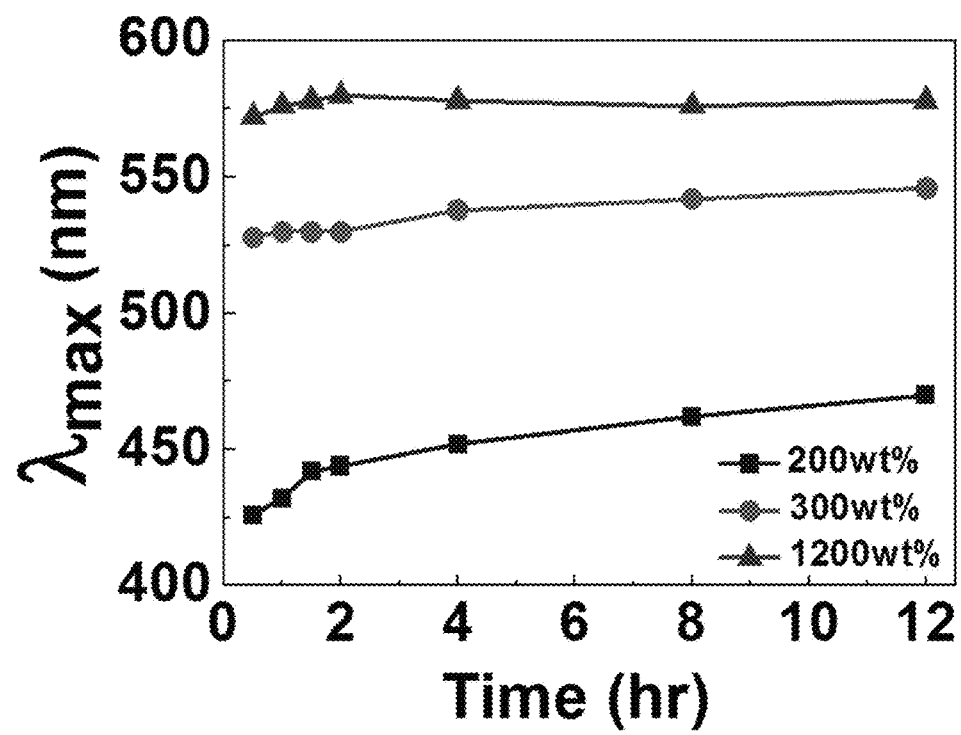
FIG. 18 is a graph plotting wavelength values having maximum reflectance based on ionic liquid contents over time.

From the graph of FIG. 16, it could be seen that a blue color was implemented for an ionic liquid having a weight percent of 200 wt % with respect to a polymer matrix, a green color was implemented for an ionic liquid having a weight percent of 300 wt % with respect to a polymer matrix, and finally a red color was implemented for an ionic liquid having a weight percent of 1200 wt % with respect to a polymer matrix. Photo images of the respective cases are included in the graph. FIG. 17 shows GISAXS images based on respective ionic liquid concentrations. It could be seen that all three cases showed one-dimensional layered structures. Domain sizes based on the three cases are shown in a graph.

As shown in FIGS. 15 and 16, it could be seen from the GISAXS images that, as the content of ionic liquid increased, the degree of swelling of the QP2VP layer increased, with the result that the periodicity of the block copolymer layered structure increased. A periodicity of 30 nm was exhibited in the case where there was no ionic liquid, a periodicity of 150 nm was exhibited in the case of 200 wt %, a periodicity of 178 nm was exhibited in the case of 300 wt %, and a periodicity of 212 nm was exhibited in the case of 1200 wt %. From FIG. 18, it could be seen that wavelength having maximum reflectance shifted over time. This indicates that time is required for the ionic liquid to be diffused throughout the block copolymer layered structure.

(2) Characteristics of Flexible Block Copolymer Photonic-crystal Thin Film 300

Figure 19:
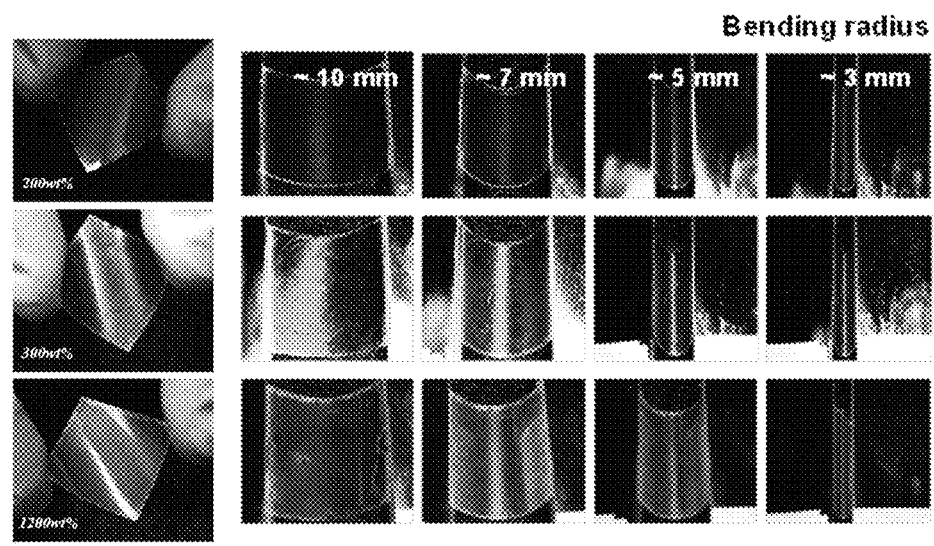
FIG. 19 shows photos illustrating the flexible characteristics of block copolymer photonic-crystal thin films on PET substrates that are formed according to an embodiment of the present invention, in which blue, green and red photonic crystal thin films are illustrated based on curvature radii sequentially from top to bottom.
Figure 20:
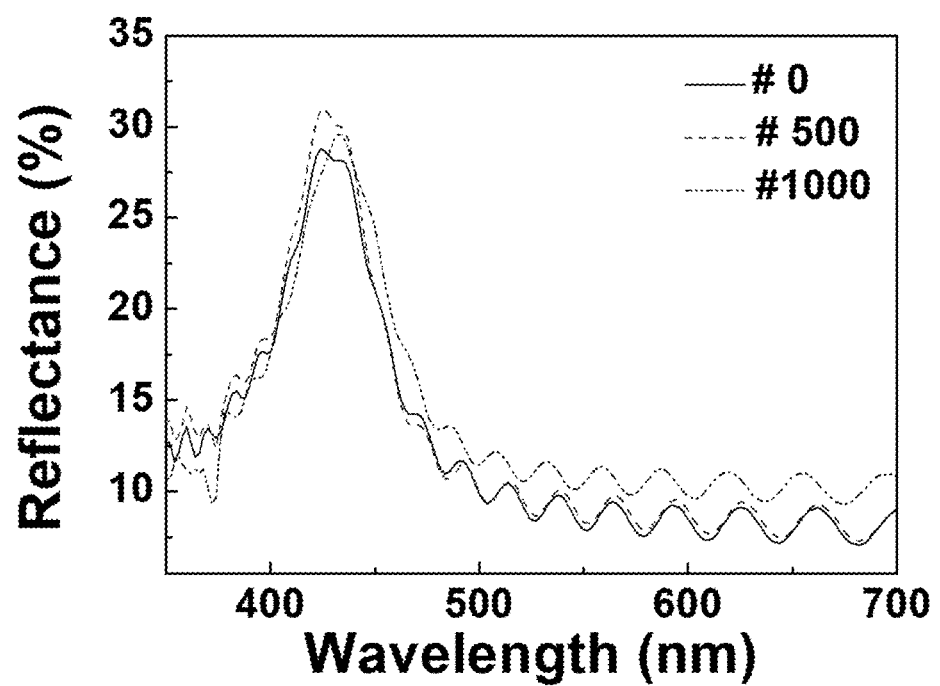
FIGS. 20 to 23 are graphs showing the durability of block copolymer photonic-crystal thin films on PET substrates according to an embodiment of the present invention.
Figure 21:
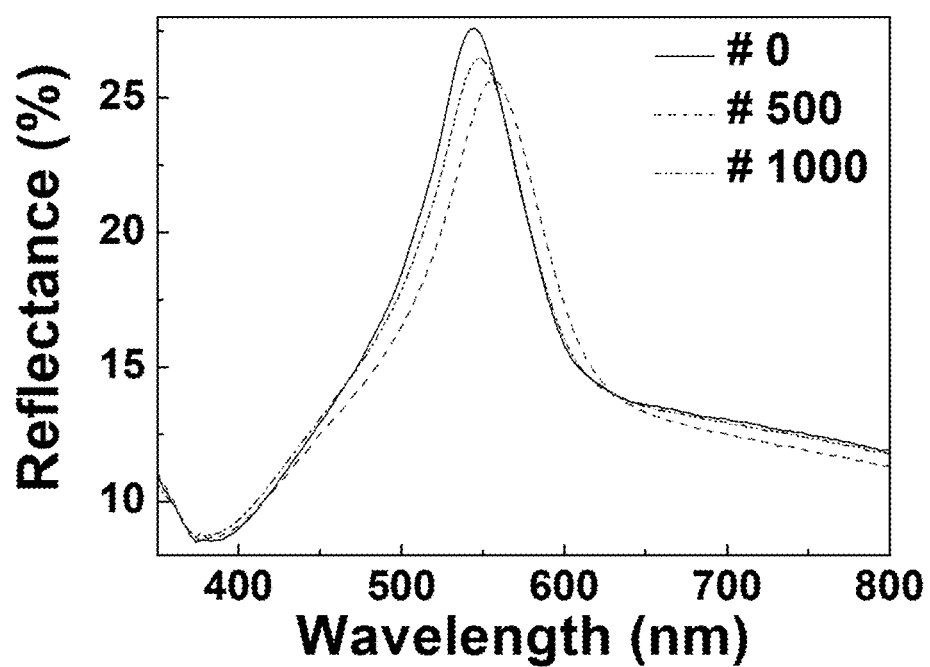

FIG. 19 shows photos illustrating the flexible characteristics of block copolymer photonic-crystal thin films 300 on PET substrates that are formed according to an embodiment of the present invention.

As shown in FIG. 19, blue, green and red photonic crystal thin films 300 are illustrated based on curvature radii sequentially from top to bottom. As illustrated in the photos, the flexible solid block copolymer photonic-crystal films can be considerably deformed on the flexible substrate, and can be also bent. The solid photonic crystal films were formed on polyethylene terephthalate substrates (having a thickness of 125 µm), and could be bent up to a curvature radius of 3 mm while maintaining red, green and blue colors, as illustrated in the photos.

FIGS. 20 to 23 are graphs showing the durability of block copolymer photonic-crystal thin films 300 on PET substrates according to an embodiment of the present invention.

Figure 22:
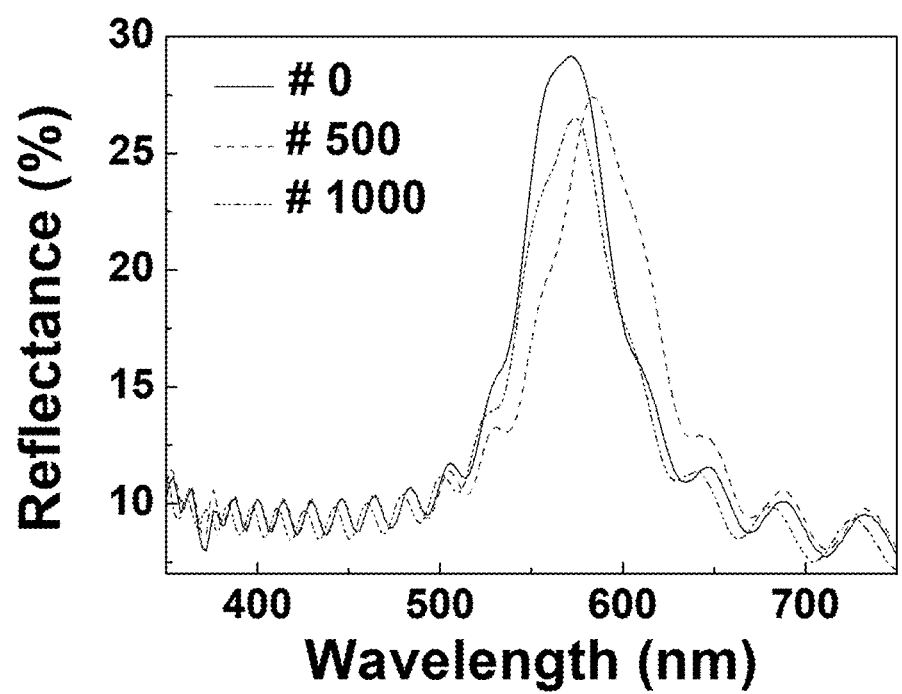
Figure 23:
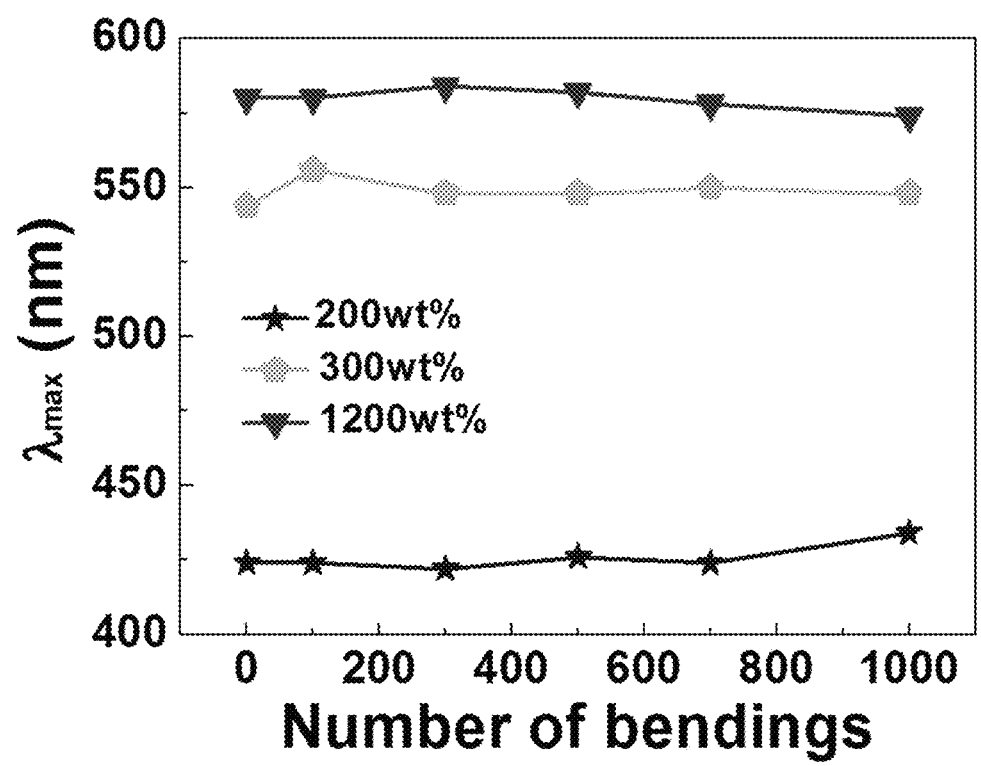

As shown in FIGS. 20 to 23, solid block copolymer photonic crystals exhibited stable colors after hundreds of instances of deformation. Reflectance was measured via three colors on the PET substrates prepared via different ionic liquid contends, and results are shown for 200 wt % (FIG. 20), for 300 wt % (FIG. 21), and for 1200 wt % (FIG. 22). As can be seen from the graph of FIG. 23, wavelengths having maximum reflectance maintained stable red, green and blue colors after 1,000 tests.

(3) Manufacture of Electrochromic Solid Block Copolymer Photonic Crystals

Figure 24:
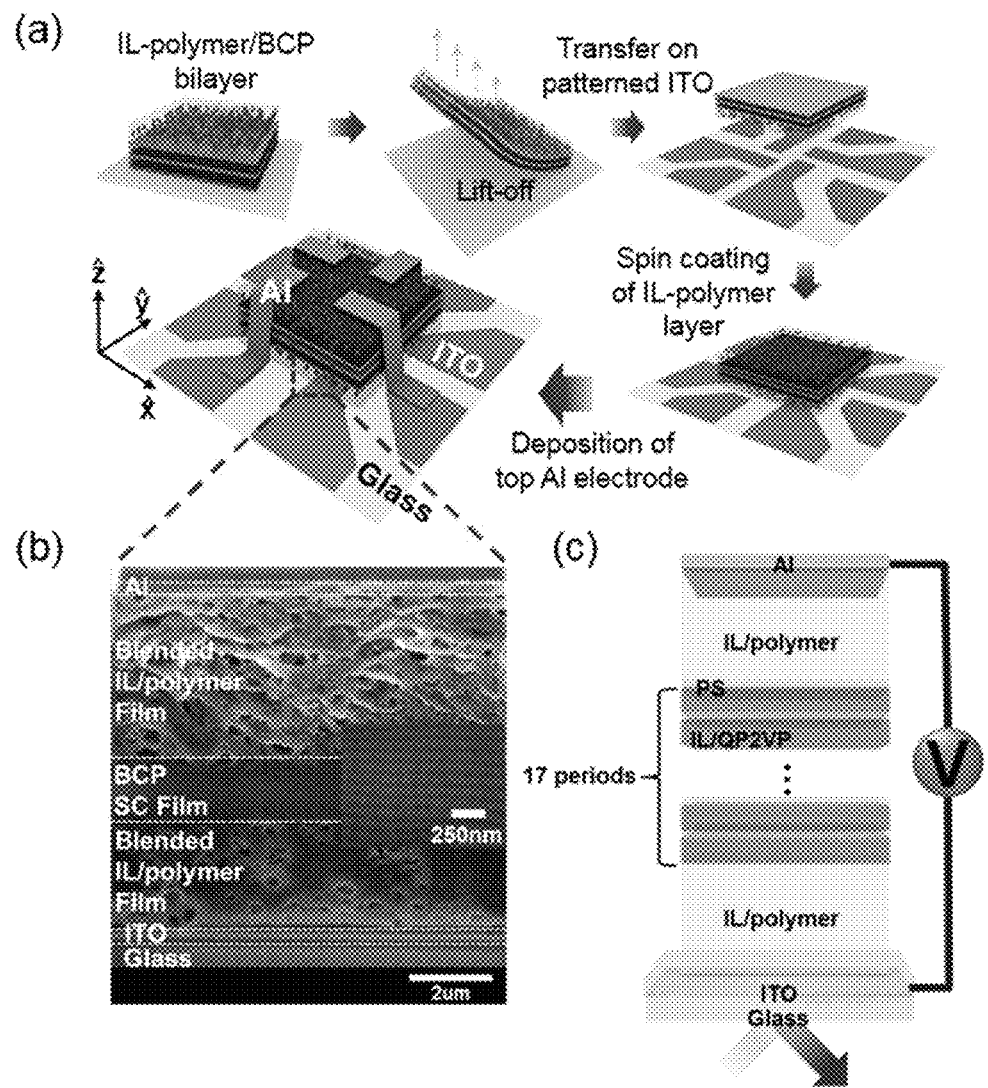
FIG. 24 is a schematic diagram of a method of manufacturing an electrochromic photonic-crystal reflective display device according to an embodiment of the present invention.
Figure 25:
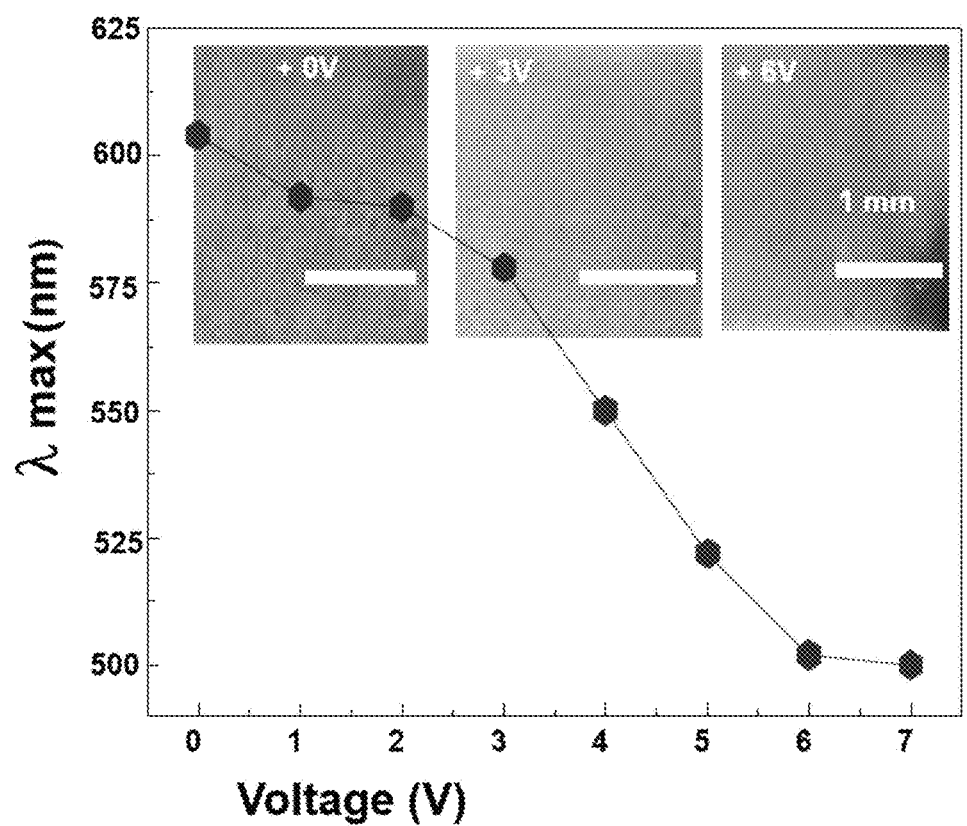
FIGS. 25 to 30 are drawings showing characteristics of an electrochromic photonic-crystal reflective display device according to an embodiment of the present invention.

FIG. 24 is a schematic diagram of a method of manufacturing an electrochromic photonic-crystal reflective display device according to an embodiment of the present invention.

Solid block copolymer photonic crystals in the visible ray area obtained in such a manner that an ionic liquid selectively swells a QP2VP layer can implement an electrochromic device by reversibly diffusing ions of the QP2VP layer throughout a polymer matrix layer via an electric field. Stable contact between a mixed layer of an ionic liquid and a polymer matrix and the block copolymer of a layered structure is significantly important to the inflow of ions via an electric field. The reason for this is that the polymer matrix layer functions to store influent ions.

Accordingly, in an embodiment of the present invention, to manufacture an electrochromic block copolymer photonic-crystal reflective display device, a sandwich structure surrounded by polymer matrices are formed, as shown in FIG. 24(a).

First, as described above, thin films, such as the block copolymer photonic-crystal thin film 300/the solid polymer electrolyte thin film, are formed on a silicon substrate (steps (a) and (b)). Thereafter, the thin films are turned over and transferred to electrodes ITO-patterned on a glass substrate through physical transfer (step (c)). Thereafter, the turned-over and transferred thin films are spin-coated with a mixed layer of an ionic liquid and a polymer matrix again to thus form a solid polymer electrolyte thin film (step (d)), thereby forming a sandwich structure in which a first and solid polymer electrolyte thin film and a second solid electrolyte thin film are formed over and beneath a block copolymer photonic-crystal thin film 300.

Thereafter, upper Al electrodes 500 are formed via vacuum thermal deposition and a metal mask (step (e), thereby implementing an electrochromic solid block copolymer photonic-crystal reflective display device in which the solid polymer electrolyte thin films each composed of a mixed layer of an ionic liquid and a polymer matrix are located over and beneath the layered structure of the block copolymer photonic-crystal thin film 300.

An SEM photo of a section of the device is shown in FIG. 24(b). As shown in FIG. 24(b), it can be seen that solid polymer electrolyte thin films, i.e., mixed layers of an ionic liquid and a polymer matrix, are present in the upper and lower portions thereof. From the SEM photo of FIG. 24(b), the layered structure of repetitive PS layers (dark portions) and QP2VP layers (bright portions) can be observed in a central block copolymer photonic-crystal thin film 300 (a BCP region). In this case, the electric potential of the PS layers in a vertical direction is an important factor that enables ionic liquids to be diffused throughout the polymer matrices.

As shown in FIG. 24(c), the structural colors reflected by the block copolymer photonic-crystal thin film based on external electric fields were measured. To further dissociate the ionic liquids in the polymer matrices, a poly(vinylidene fluoride-trifluoroethylene-chlorofloroethylene) (PVDF-TrFE-CFE) polymer was used in place of PVDF-TrFE. A PVDF-TrFE-CFE polymer (k≈30) having a dielectric constant larger than that (k≈12) of PVDF-TrFE more effectively dissociated the ionic liquids, from which it could be seen that ion conductivity increased.

FIGS. 25 to 30 are drawings showing characteristics of an electrochromic photonic-crystal reflective display device according to an embodiment of the present invention.

As shown in FIGS. 25 to 30, it can be seen that the structural color of photonic crystals varies depending on an electric field that is applied in an embodiment of the present invention. From FIG. 25, it can be seen that a wavelength value having maximum reflectance shifted to a smaller value in response to an applied electric field because the domain size of the QP2VP layer was decreased. The color of the block copolymer photonic crystal device that had been red in its initial state was changed to a green color when 3 V was applied to upper electrodes, and was changed to a blue color when 6 V was applied. Photos of the surface colors of photonic crystals photo were taken and shown in a graph.

Figure 26:
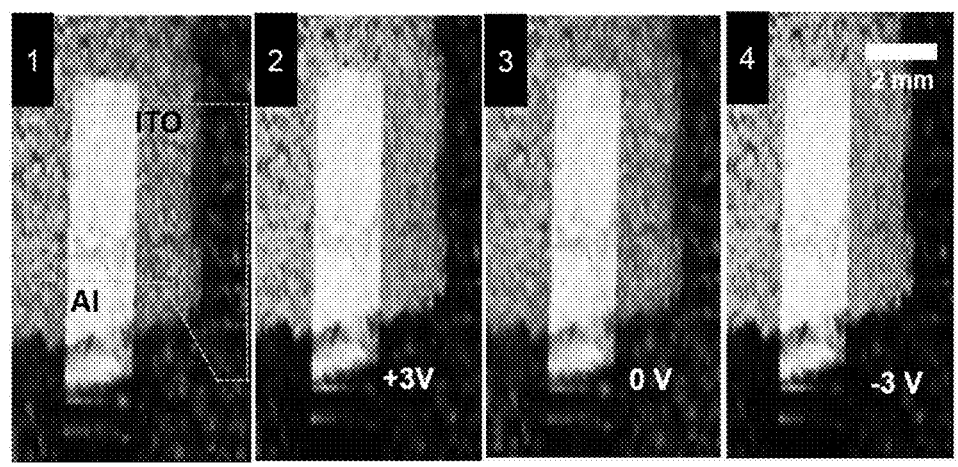

In this case, it is more important that a change in color is reversible based on applied voltage. For example, as shown in FIG. 26, the color of a surface changed to a green color in response to the application of 3 V was returned to a red color in its initial state when the voltage was removed. Thereafter, when 3 V was applied, the color of the surface was changed to a green color in the same manner.

These results indicate that Li+ ions or TFSi− ions were moved out of a QP2VP layer and thus deswelled a QP2VP layer, with the result that the reflection wavelength of photonic crystals was shortened. Unlike in a device in which mixed layers of a polymer matrix and an ionic liquid are located in the upper and lower portions thereof, in a case where a mixed layer of a polymer matrix and an ionic liquid was present on the top thereof, color was not changed even when 3 V was applied to upper electrodes. This indicates that TFSi– ions had larger sizes than Li+ ions and thus did not react in response to an electric field.

Figure 27:
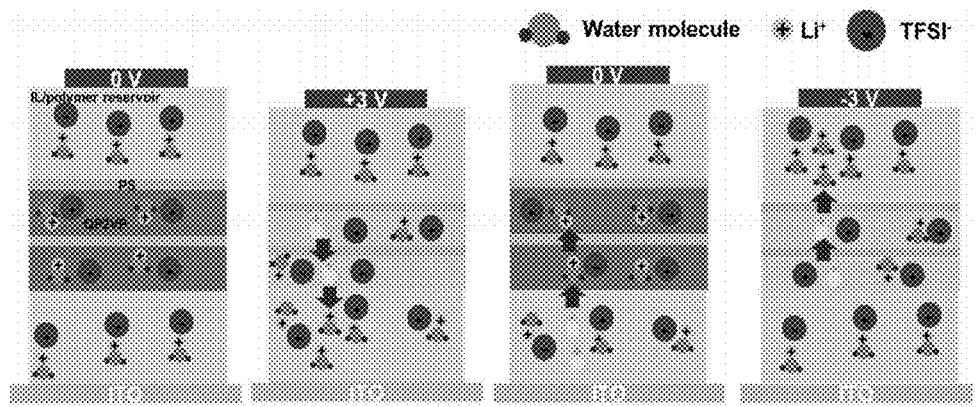

When voltage was not applied, ionic liquids were present not only in solid polymer electrolyte thin films, i.e., mixed layers of a polymer matrix and an ionic liquid, but also in the layered structure of a block copolymer photonic-crystal thin film 300, as shown in FIG. 27.

Thereafter, when a voltage of 3 V was applied to upper electrodes, Li ions were moved to a lower polymer matrix layer by repulsive force, and thus a QP2VP layer was deswelled, with the result that the structural color of photonic crystals was changed to a green color.

When the voltage was removed, the Li ions moved to the lower polymer matrix were returned to the QP2VP layer by attractive force in connection with TFSi, with the result that the corresponding region was swelled.

In contrast, when −3 V was applied to an upper portion, Li ions were moved to an upper polymer matrix layer. When the voltage was removed, the Li ions were moved to the QP2VP layer.

From this, it can be seen that it is important to the electrochromism of a solid photonic crystal device that solid polymer electrolyte thin film layers each including a polymer matrix are located in upper and lower portions.

The two solid polymer electrolyte thin film layers effectively functioned as storage from which ions can be moved in response to an electric field. The electrochromic speed and reproducibility of the photonic crystals were analyzed through UV-vis spectroscopy. Since electrochromism is based on the diffusion of Li ions driven via an electric field, the time required for electrochromism is influenced not only by a diffusion coefficient in a block copolymer region but also by a diffusion coefficient in a polymer matrix.

For reference, the PS layer is a region that is not swell or deswelled. The PS layer functions to reflect selective wavelength bands in photonic crystals. The reason for this is that the PS layer generates constructive interference and destructive interference based on the differences in refractive index between two layers. That is, when only a QP2VP layer is present, color is not exhibited regardless of swelling and deswelling.

Figure 28:
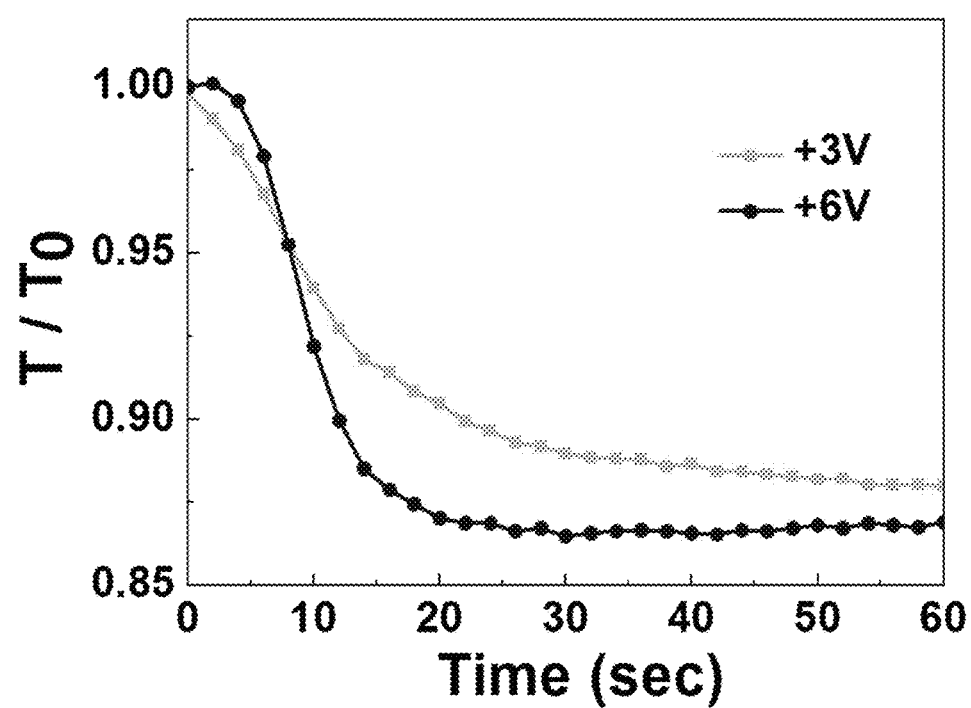
Figure 29:
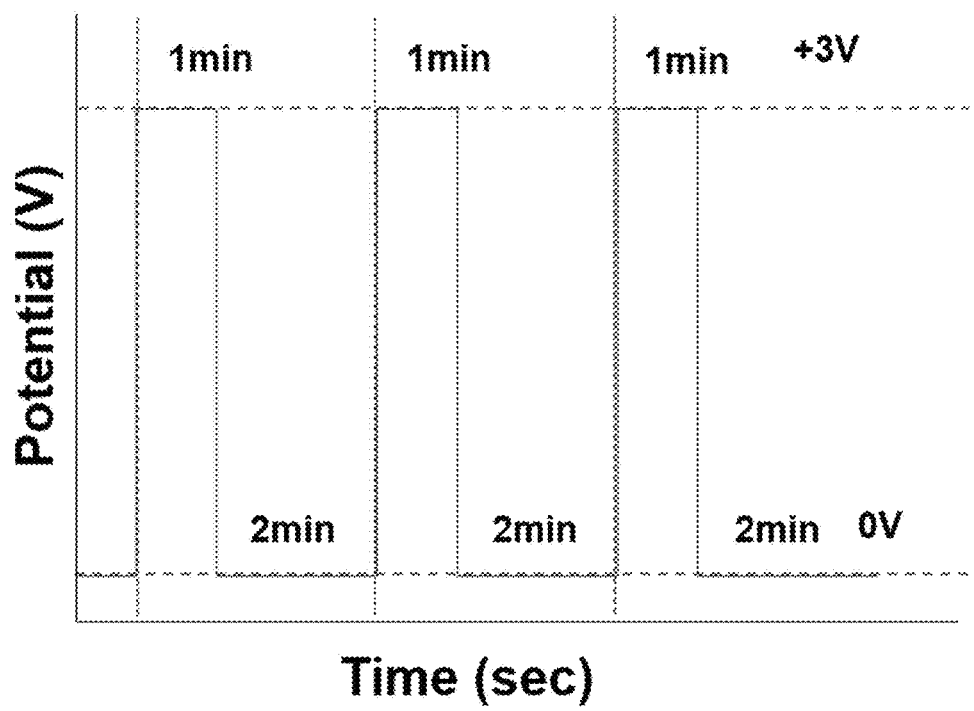
Figure 30:
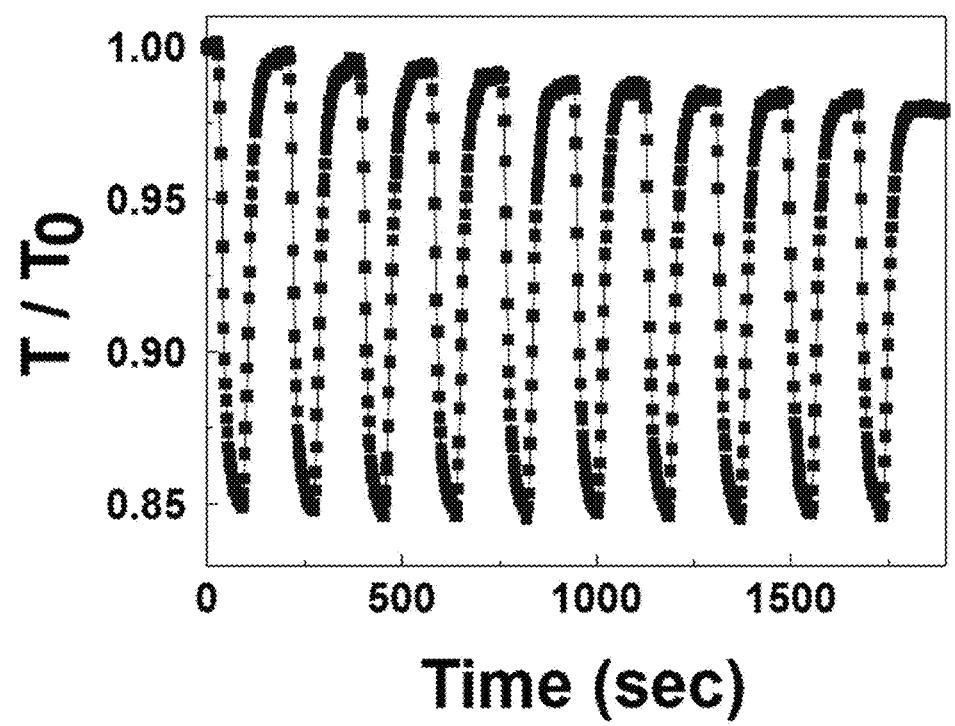

As can be seen from FIG. 28, a change from a green color to a blue color took a time of about 30 seconds. Since diffusion speed is proportional to distance, it can be seen that, as thickness decreased, electrochromic speed increased. To measure the repetitive electrochromism of the device, a voltage of +6 V was applied for one minute and then removed for two minutes, as shown in FIG. 29. It was seen from FIG. 30 that there was no significant difference between an initial transmissivity value and a transmissivity value after 10 changes in color. The color of the photonic crystal device exhibited stability for one hour during which an electric field was applied.

The electrochromic photonic-crystal reflective display device and the method of manufacturing the electrochromic photonic-crystal reflective display device according to the present invention have the following advantages:

First, the present invention provides the photonic-crystal reflective display device which can be manufactured using a simple manufacturing process of mixing a polymer matrix and an ionic liquid and performing spin coating, and also provides the method of manufacturing the photonic-crystal reflective display device.

Second, the present invention provides the photonic-crystal reflective display device in which the color exhibited by the thin films can be adjusted based on the mixing ratio between the ionic liquid and the polymer matrix, and also provides the method of manufacturing the photonic-crystal reflective display device.

Third, the present invention provides the solid block copolymer photonic-crystal reflective display device which can reversibly change color using electricity as an external stimulus, and also provides the method of manufacturing the solid block copolymer photonic-crystal reflective display device.

Fourth, the present invention provides the electrochromic photonic-crystal reflective display device which can overcome difficulty in manufacturing a flexible device resulting from volatility, flammability and sealing problems attributable to the use of the liquid electrolyte, and also provides the method of manufacturing the electrochromic photonic-crystal reflective display device.

Fifth, the present invention provides the photonic-crystal reflective display device in which the color exhibited by the thin films can be adjusted using a sandwich structure in which the polymer electrolyte thin films are disposed over and beneath the block copolymer photonic-crystal thin film, and also provides the method of manufacturing the photonic-crystal reflective display device.

Advantages of the present invention are not limited to the above-described advantages, and other advantages that have not been described will be readily apparent to those skilled in the art from the above description.

The embodiments described herein and the drawings attached hereto illustrate merely some of technical spirit included in the present invention. Accordingly, the embodiments disclosed herein are not intended to limit the technical spirit of the present invention, but are intended to illustrate the technical spirit of the present invention. Therefore, it will be apparent that the range of the technical spirit of the present invention is not limited to these embodiments. Modifications and specific embodiments that can be readily derived by those skilled in the art from the range of technical spirit included in the present specification and the attached drawings should be interpreted as falling within the range of the rights of the present invention.

What is claimed is:

1. An electrochromic photonic-crystal reflective display device, comprising:
    a substrate including lower electrodes;
    a first solid polymer electrolyte thin film formed on the substrate, and made from a mixed solution including a polymer electrolyte and an ionic liquid;
    a block copolymer photonic-crystal thin film formed on the first solid polymer electrolyte thin film;
    a second solid polymer electrolyte thin film formed on the block copolymer photonic-crystal thin film, and made from a mixed solution including a polymer electrolyte and an ionic liquid; and
    upper electrodes formed on the second solid polymer electrolyte thin film.

2. The electrochromic photonic-crystal reflective display device of claim 1, wherein color of reflected light is adjusted according to voltage applied to the lower electrodes and the upper electrodes.

3. The electrochromic photonic-crystal reflective display device of claim 1, wherein electrochromic speed of reflected light is adjusted according to thickness of the polymer electrolyte thin films.

4. The electrochromic photonic-crystal reflective display device of claim 1, wherein the substrate is a transparent electrode substrate that is an ITO substrate.

5. The electrochromic photonic-crystal reflective display device of claim 1, wherein the polymer electrolyte includes a polymer electrolyte matrix and lithium ions.

6. The electrochromic photonic-crystal reflective display device of claim 5, wherein the polymer electrolyte matrix is at least any one of PVDF-TrFE, PS-b-PMMA-b-PS, PVDF-HFP, and PVDF-TrFE-CFE.

7. The electrochromic photonic-crystal reflective display device of claim 5, wherein the lithium ions included in the polymer electrolyte are any one of LiTFSI(Bis(trifluoromethane)sulfonimide lithium) and lithium trifluoroacetate.

8. The electrochromic photonic-crystal reflective display device of claim 1, wherein, in the polymer electrolyte thin films, a mixing ratio of the ionic liquid is any one of 200 wt %, 300 wt %, 400 wt %, 600 wt %, 800 wt %, and 1200 wt % with respect to a polymer.

9. The electrochromic photonic-crystal reflective display device of claim 1, wherein the block copolymer photonic-crystal thin film has a layered structure including a selective swelling layer.

10. The electrochromic photonic-crystal reflective display device of claim 1, wherein the selective swelling layer is a QP2VP layer.

11. The electrochromic photonic-crystal reflective display device of claim 1, wherein the block copolymer photonic-crystal thin film is a photonic crystal thin film that is formed by subjecting a block copolymer thin film to quaternization and cross-linking.

12. The electrochromic photonic-crystal reflective display device of claim 1, wherein the block copolymer photonic-crystal thin film is formed by immersing a solvent-annealed block copolymer thin film in a solution in which bromoethane and dibromobutane are mixed in a predetermined ratio, and generating quaternization and cross-linking.

13. The electrochromic photonic-crystal reflective display device of claim 12, wherein bromoethane and dibromobutane are mixed in a ratio at which a sum of bromoethane and dibromobutane is 20 vol % of hexane.

14. The electrochromic photonic-crystal reflective display device of claim 12, wherein, in the mixed solution, a mass ratio between dibromobutane and bromoethane is any one of 0, 0.05, and 0.1, wherein 0 means that a dibromobutane content is zero.

* * * * *